(12) United States Patent
Wang et al.

(10) Patent No.: US 10,856,309 B2
(45) Date of Patent: Dec. 1, 2020

(54) USER EQUIPMENT AND BASE STATION FOR MOBILE COMMUNICATION SYSTEM

(71) Applicant: Institute For Information Industry, Taipei (TW)

(72) Inventors: Hai-Han Wang, Taipei (TW); Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 21 days.

(21) Appl. No.: 16/373,627

(22) Filed: Apr. 2, 2019

(65) Prior Publication Data

US 2019/0306921 A1    Oct. 3, 2019

Related U.S. Application Data

(60) Provisional application No. 62/651,732, filed on Apr. 3, 2018.

(51) Int. Cl.
*H04W 72/12* (2009.01)
*H04L 5/00* (2006.01)
*H04W 72/04* (2009.01)

(52) U.S. Cl.
CPC ....... *H04W 72/1242* (2013.01); *H04L 5/0048* (2013.01); *H04L 5/0055* (2013.01); *H04L 5/0057* (2013.01); *H04W 72/0446* (2013.01)

(58) Field of Classification Search
CPC ... H04L 5/0048; H04L 5/0055; H04L 5/0057; H04W 72/0046; H04W 72/1242; H04W 72/0446
See application file for complete search history.

(56) References Cited

U.S. PATENT DOCUMENTS

2019/0261391 A1 *   8/2019   Kundu ............. H04W 72/0446

* cited by examiner

*Primary Examiner* — Kevin C. Harper
(74) *Attorney, Agent, or Firm* — Skaar Ulbrich Macari, P.A.

(57) ABSTRACT

A user equipment (UE) and a base station (BS) for a mobile communication system are provided. The UE divides a plurality of uplink radio resources into at least one group and determines whether there exist pieces of uplink information corresponding to the uplink radio resources. When the corresponding pieces of the uplink information exist, the UE determines whether there exist overlapped periods in the time domain among the corresponding uplink radio resources. For any two of the corresponding uplink radio resources having the overlapped period, the UE decides how to transmit the corresponding pieces of uplink information based on whether the two of the corresponding uplink radio resources belonging to the same group or not, whether the corresponding pieces of uplink information can be jointly transmitted or not, and the priorities of the uplink information.

18 Claims, 30 Drawing Sheets

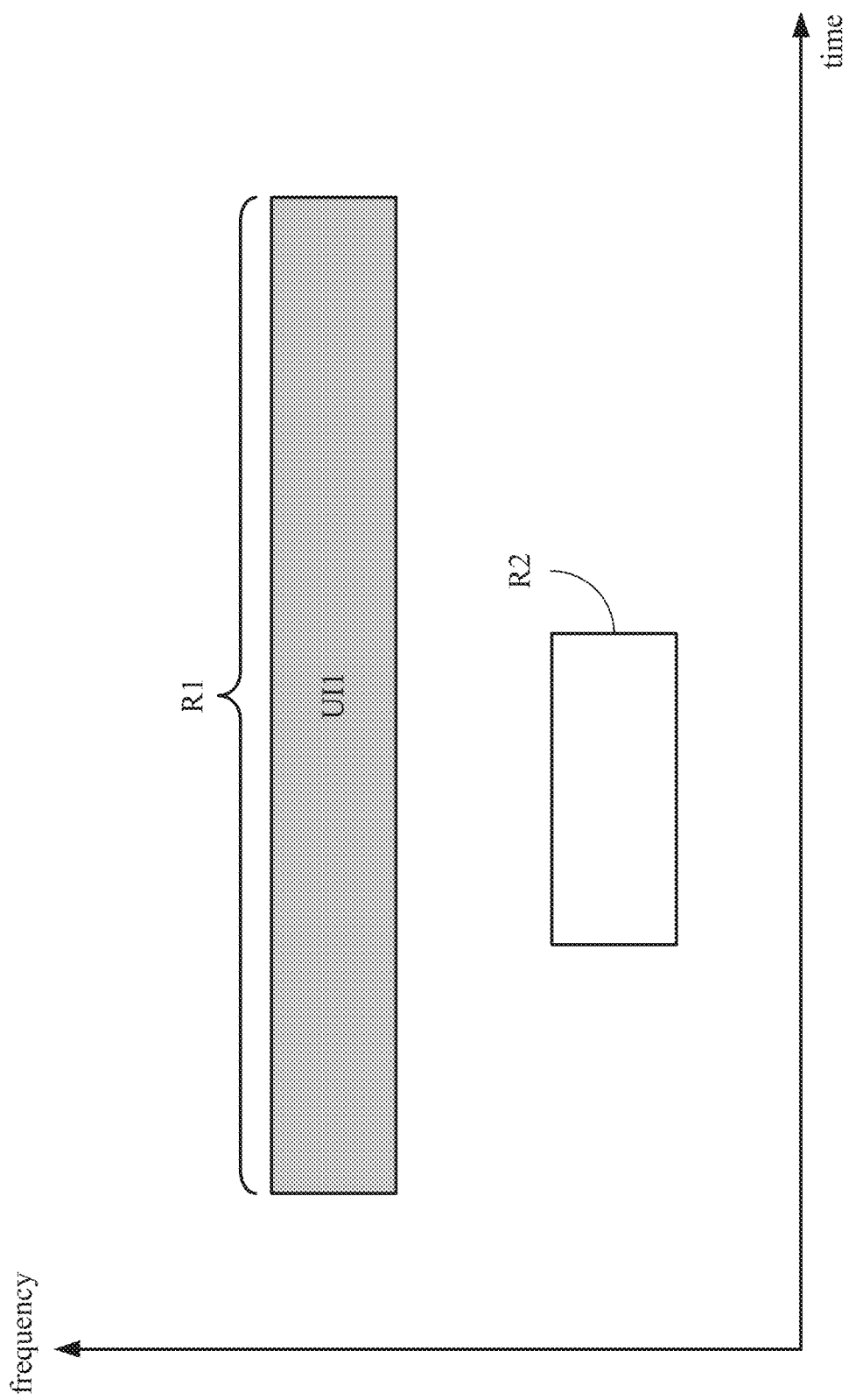

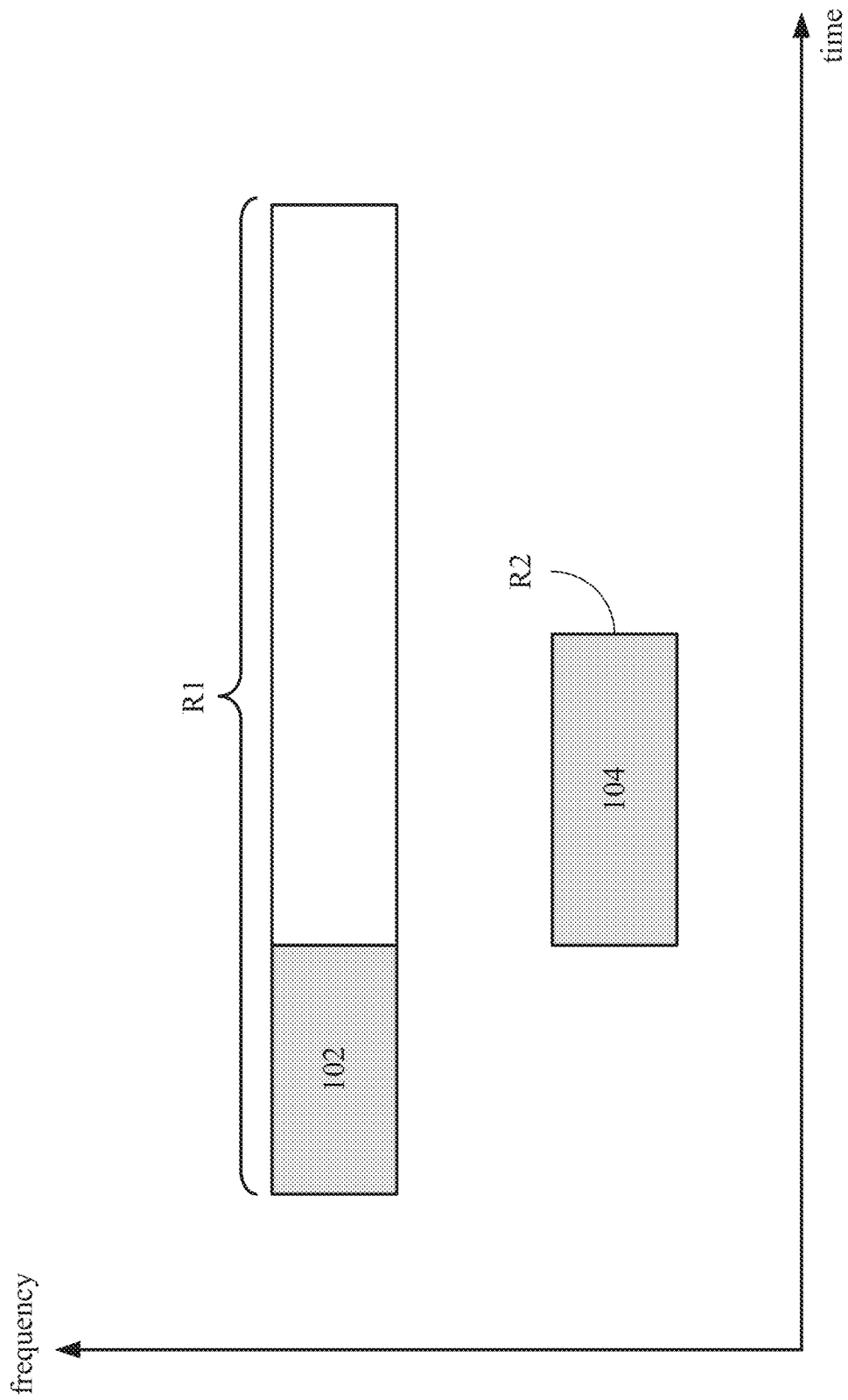

USER EQUIPMENT AND BASE STATION FOR MOBILE COMMUNICATION SYSTEM

PRIORITY

This application claims priority to U.S. Provisional Patent Application No. 62/651,732 filed on Apr. 3, 2018, which is hereby incorporated by reference in its entirety.

FIELD

The present invention relates to a user equipment (UE) and a base station (BS) for a mobile communication system. More particularly, when multiple uplink radio resources, which multiple pieces of uplink information corresponds to, overlap in the time domain, the UE may decide how to transmit each piece of uplink information according to whether the uplink radio resources are divided into the same group, whether the multiple piece of uplink information can be jointly transmitted and the priority of the multiple pieces of uplink information.

BACKGROUND

With the rapid development of wireless communication technologies, wireless communication has found wide application in people's life, and people's demand for wireless communication is increasing. To satisfy various applications in daily life, the next generation of mobile communication system (which is generally referred to as the 5G mobile communication system currently) has proposed new service types, e.g., Ultra-reliable and Low Latency Communication (URLLC), Enhanced Mobile Broadband (eMBB) communication, and Massive Machine Type Communication (mMTC).

In the recent design of the 5G mobile communication system, the BS may pre-configure or schedule, in response to the transmission of downlink information, some physical uplink control channel (PUCCH) resources for the UE to transmit specific uplink control information such as the scheduling request, the channel state information and hybrid automatic repeat request acknowledgement (HARQ-ACK). However, these pieces of uplink control information are transmitted on the corresponding PUCCH resources, and the UE cannot transmit the pieces of uplink control information on different PUCCH resources at the same time due to the limitation of transmission capability. Therefore, when the PUCCH resources overlap in the time domain and the pieces of corresponding uplink control information exist at the same time, the UE has to determine the importance of each uplink control information and decide to transmit the uplink control information with higher priority only. In this situation, the BS may re-transmit downlink data signal because it does not receive the uplink control information with lower priority (i.e., HARQ-ACK) and further cause the waste of resources.

In addition, the URLLC service type, among the aforementioned service types, has low latency transmission requirement and needs to successfully transmit data to the BS within a bounded latency, so the uplink control information (e.g., the scheduling request) related to the URLLC service is quite important. If the uplink control information related to the URLLC service is dropped, the BS cannot schedule uplink radio resources in time so that the transmission latency will increase. However, in the recent design of the 5G mobile communication system, if the uplink control information with the lower priority is transmitting, even there exists uplink control information with the higher priority (e.g., the scheduling request of URLLC service), the UE can only transmit the uplink control information with the higher priority on the next corresponding PUCCH resource. Therefore, the requirement of URLLC service cannot be satisfied.

Accordingly, an urgent need exists in the art to provide an uplink information transmission mechanism to solve problem of the overlapped uplink radio resources during the transmission of uplink information at the UE.

SUMMARY

Provided is an uplink information transmission mechanism which makes the UE divide the uplink radio resources into different groups when the uplink radio resources, which multiple pieces of uplink information correspond to, overlap in the time domain, and decide how to transmit the uplink information. This can reduce the possibility of dropping the uplink control information with the lower priority and make sure that the uplink control information with the higher priority can be transmitted to meet the requirement of URLLC service under the condition that the UE transmits the uplink control information with the higher priority first.

Provided also is a user equipment (UE) for a mobile communication system. The UE can comprise a storage, a transceiver and a processor. The processor is electrically connected to the storage and the transceiver, and is configured to execute the following operations: determining that there are a plurality of uplink radio resources and dividing the uplink radio resources into at least one group; determining whether there exists a piece of first uplink information corresponding to a first uplink radio resource of the uplink radio resources; determining whether there exists a piece of second uplink information corresponding to a second uplink radio resource of the uplink radio resources; determining whether an overlapped period exists in a time domain between the first uplink radio resource and the second uplink radio resource when the first uplink information and the second uplink information exist at the same time; determining whether the first uplink radio resource and the second uplink radio resource belong to a first group of the at least one group when the overlapped period exists; determining whether the first uplink information and the second uplink information can be jointly transmitted; transmitting, via the transceiver, the first uplink information and the second uplink information on one of the first uplink radio resource and the second uplink radio resource when the first uplink information and the second uplink information can be jointly transmitted; and transmitting, via the transceiver, one of the first uplink information and the second uplink information on one of the first uplink radio resource and the second uplink radio resource based on a priority decision when the first uplink information and the second uplink information cannot be jointly transmitted or when only one of the first uplink information and the second uplink information belongs to the first group.

Further provided is a user equipment (UE) for a mobile communication system. The UE can comprise a storage, a transceiver and a processor. The processor is electrically connected to the storage and the transceiver, and is configured to execute the following operations: determining that there are a plurality of uplink radio resources and dividing a plurality of first uplink radio resources, which belong to a first information type, of the uplink radio resources into at least one group; determining whether there exists at least one piece of first uplink information corresponding to at least one of the first uplink radio resources; determining whether there exists a piece of second uplink information corresponding to a second uplink radio resource of the uplink radio resources; determining whether an overlapped period exists between the at least one of the first uplink radio resources, to which the at least one piece of first uplink information corresponds, and the second uplink radio resource on a time domain when the at least one piece of first uplink information and the second uplink information exist at the same time; generating a piece of group information according to the at least one group when the overlapped period exists; and transmitting, via the transceiver, the second uplink information and the group information on the second uplink radio resource.

Additionally provided is a base station (BS) for a mobile communication system. The BS can comprise a storage, a transceiver and a processor. The processor is electrically connected to the storage and the transceiver, and is configured to execute the following operations: determining that there are a plurality of uplink radio resources and dividing the uplink radio resources into at least one group; determining that there exists an overlapped period between a first uplink radio resource and a second uplink radio resource of the uplink radio resources in a time domain; determining whether the first uplink radio resource and the second uplink radio resource belong to a same group of the at least one group; determining whether a piece of first uplink information corresponding to the first uplink radio resource and a piece of second uplink information corresponding to the second uplink radio resource can be jointly transmitted on one of the first uplink radio resource and the second uplink radio resource; determining whether a first uplink signal on the first uplink radio resource is received via the transceiver; determining whether a second uplink signal on the second uplink radio resource is received via the transceiver; decoding the first uplink signal to obtain the first uplink information or obtain the first uplink information and the second uplink information at the same time when only receiving the first uplink signal on the first uplink radio resource and the first uplink information and the second uplink information can be jointly transmitted on the first uplink radio resource; decoding the second uplink signal to obtain the first uplink information or obtain the first uplink information and the second uplink information at the same time when only receiving the second uplink signal on the second uplink radio resource and the first uplink information and the second uplink information can be jointly transmitted on the second uplink radio resource; and decoding the second uplink signal to obtain the second uplink information if the first uplink radio resource and the second uplink radio resource does not belong to the identical group when receiving the first uplink signal on the first uplink radio resource and receiving the second uplink signal on the second uplink radio resource, wherein only the second uplink radio resource has the second uplink signal during the overlapped period.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIGS. 1B-1K depict different implementation scenarios of information transmission in one slot according to the present invention;

DETAILED DESCRIPTION

In the following description, the present invention will be explained with reference to certain example embodiments thereof. However, these example embodiments are not intended to limit the present invention to any particular environment, applications, examples, embodiments, or implementations described in these example embodiments. Therefore, description of these example embodiments is only for the purpose of illustration rather than to limit the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
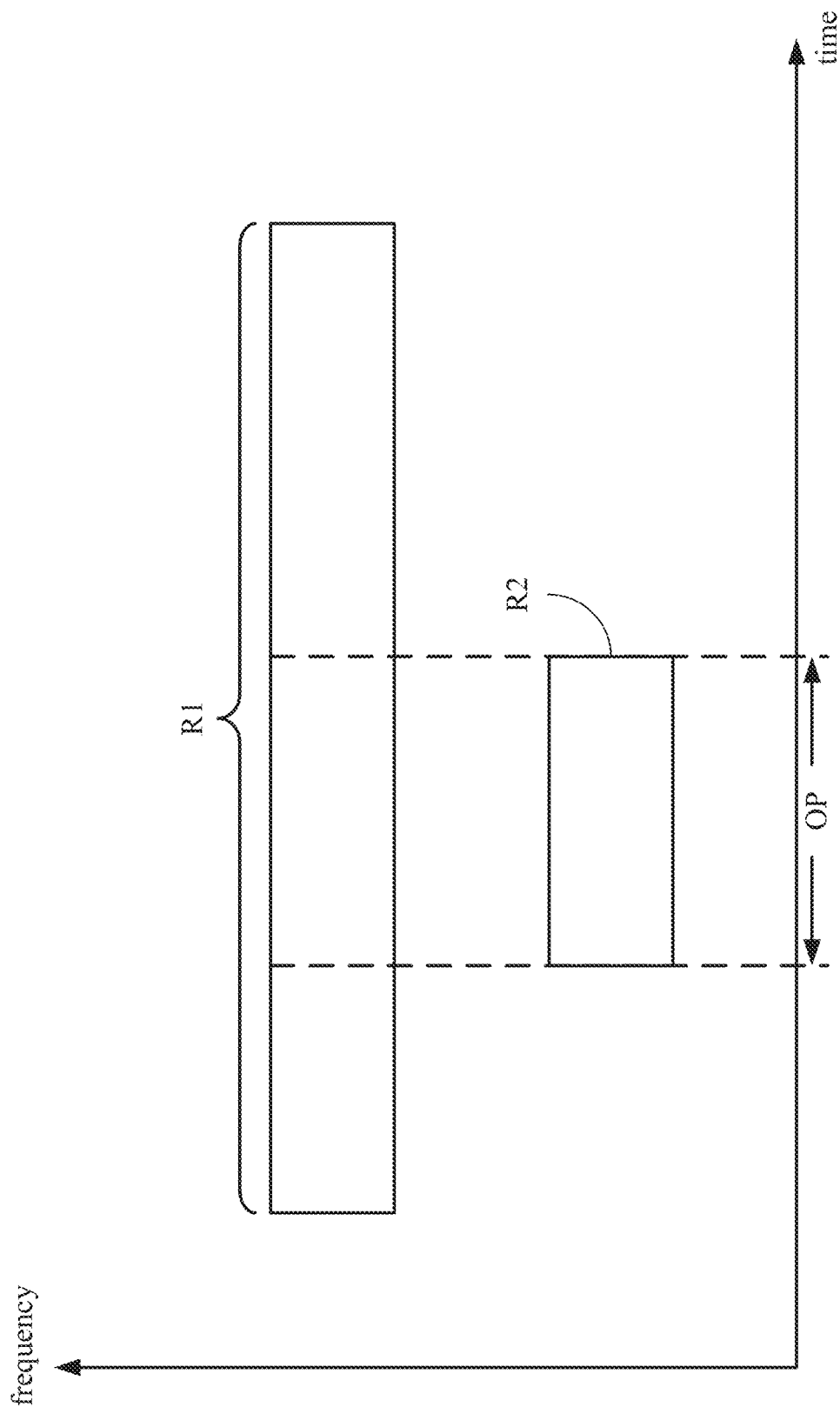
FIG. 1A depicts a schematic view of a configuration of uplink radio resources according to the present invention.

A first embodiment of the present invention is as shown in FIG. 1A to FIG. 1K. FIG. 1A depicts a schematic view of a configuration of uplink radio resources according to the present invention. As restricted by the paper size, FIG. 1A to FIG. 1K only depict the scenarios of the radio resource configuration in one slot. As described above, the BS 2 may pre-configure or schedule, in response to the BS 2 transmits downlink information, uplink radio resources for the UE 1 to transmit uplink information. For simplification, the uplink radio resources herein refers to physical uplink control channel (PUCCH) resources and the uplink information herein refers to uplink control information (UCI), e.g., a scheduling request (SR) or channel state information (CSI) and a hybrid automatic repeat request acknowledgement (HARQ-ACK). However, in other embodiment, the uplink radio resources may include uplink grant free resources on the physical uplink shared channel (PUSCH) as well, and the uplink information may include grant free uplink data as well. Since those of ordinary skill in the art could appreciate that how the uplink information transmission mechanism of the present invention operates under the condition that the uplink radio resources includes uplink grant free resources on the PUSCH as well and thus will be not further described herein.

Each of the PUCCH resources configured or scheduled by the BS 2 corresponds to a logical channel. Each of the logical channels corresponds to a service type, and each of the service types corresponds to requirements of data amount, transmission reliability and latency. For example, if a logical channel, which a PUCCH resource corresponds to, corresponds to the URLLC service, once the UE 1 transmits a scheduling request on the PUCCH resource, the BS 2 would learn that the received scheduling request was triggered by which logical channel, and the BS 2 would configure the uplink radio resource (i.e., the radio resource on the PUSCH) requested by the UE 1 for the UE 1 to transmit uplink data according to the service type (i.e., the URLLC service) which the logical channel corresponds to.

In detail, the service type, which the logical channel corresponds to, may be one of the URLLC service, the eMBB service and the mMTC service, but not limited thereto. Compared to the eMBB service and the mMTC service, the URLLC service requires higher transmission reliability and lower transmission latency, so the BS 2 may directly configure enough resources for the UE 1 to make the UE 1 transmit entire URLLC data to the BS 2 in time once the BS 2 determines that the PUCCH resource of the received scheduling request belongs to the URLLC service.

In the present invention, before transmitting uplink control information, the UE 1 divides the PUCCH resources configured and scheduled by the BS 2 into at least one group according to the logical channels to which the PUCCH resources correspond (i.e., the logical channels to which the pieces of the control information dedicated to be carried by the PUCCH resources correspond). For example, the UE 1 divides the PUCCH resources corresponding to a first logical channel into the same group, and divides the PUCCH resources corresponding to a second logical channel into the same group, wherein the first logical channel corresponds to the URLLC service and the second logical channel corresponds to the eMBB service. The PUCCH resources preconfigured by the BS 2 can be used for transmitting the SR and the CSI, and the PUCCH resources scheduled by the BS 2 can be used by the UE 1 to transmit the HARQ-ACK which indicates the successful reception (i.e., ACK) or the erroneous reception (i.e., NACK) based on the HARQ. Thus, the BS 2 may learn whether the downlink information retransmission is needed.

The UE 1 determines whether there exists a piece of first uplink information UI1 corresponds to a first PUCCH resource R1 of the PUCCH resources and determines whether there exists a piece of second uplink information UI2 corresponding to a second PUCCH resource R2 of the PUCCH resources. The UE 1 further determines whether an overlapped period OP exists in the time domain between the first PUCCH resource R1 and the second PUCCH resource R2 when the first uplink information UI1 and the second uplink information UI2 exist at the same time.

When the overlapped period OP exists, the UE 1 determines whether the first PUCCH resource R1 and the second PUCCH resource R2 belong to a first group of the at least one group, i.e., determines whether the first PUCCH resource R1 and the second PUCCH resource R2 belong to the same group. The UE 1 further determines whether the first uplink information UI1 and the second uplink information UI2 can be jointly transmitted when the first PUCCH resource R1 and the second PUCCH resource R2 belong to the first group.

When the first uplink information UI1 and the second uplink information UI2 can be jointly transmitted, the UE 1 transmits the first uplink information UI1 and the second uplink information UI2 on one of the first PUCCH resource R1 and the second PUCCH resource R2. On the contrary, when the first uplink information UI1 and the second uplink information UI2 cannot be jointly transmitted or when only one of the first uplink information UI1 and the second uplink information UI2 belongs to the first group, the UE 1 transmits one of the first uplink information UI1 and the second uplink information UI2 on one of the first PUCCH resource R1 and the second PUCCH resource R2 based on a priority decision. The priority decision is made according to at least one of an information type, the logical channel which each of the uplink radio resources corresponds to, a resource periodicity and a resource overlapping condition.

Specifically, the time points that the UE 1 processes information can further be separated into in the media access control (MAC) layer and in the physical (PHY) layer. When the first uplink information UI1 and the second uplink information UI2 are still processed in the MAC layer, if the UE 1 determines that the first PUCCH resource R1 and the second PUCCH resource R2 are overlapped with each other in the time domain and the first PUCCH resource R1 and the second PUCCH resource R2 belong to the same group, then the UE 1 will forward the first uplink information UI1 and the second uplink information UI2 to the PHY layer.

Figure 1B:
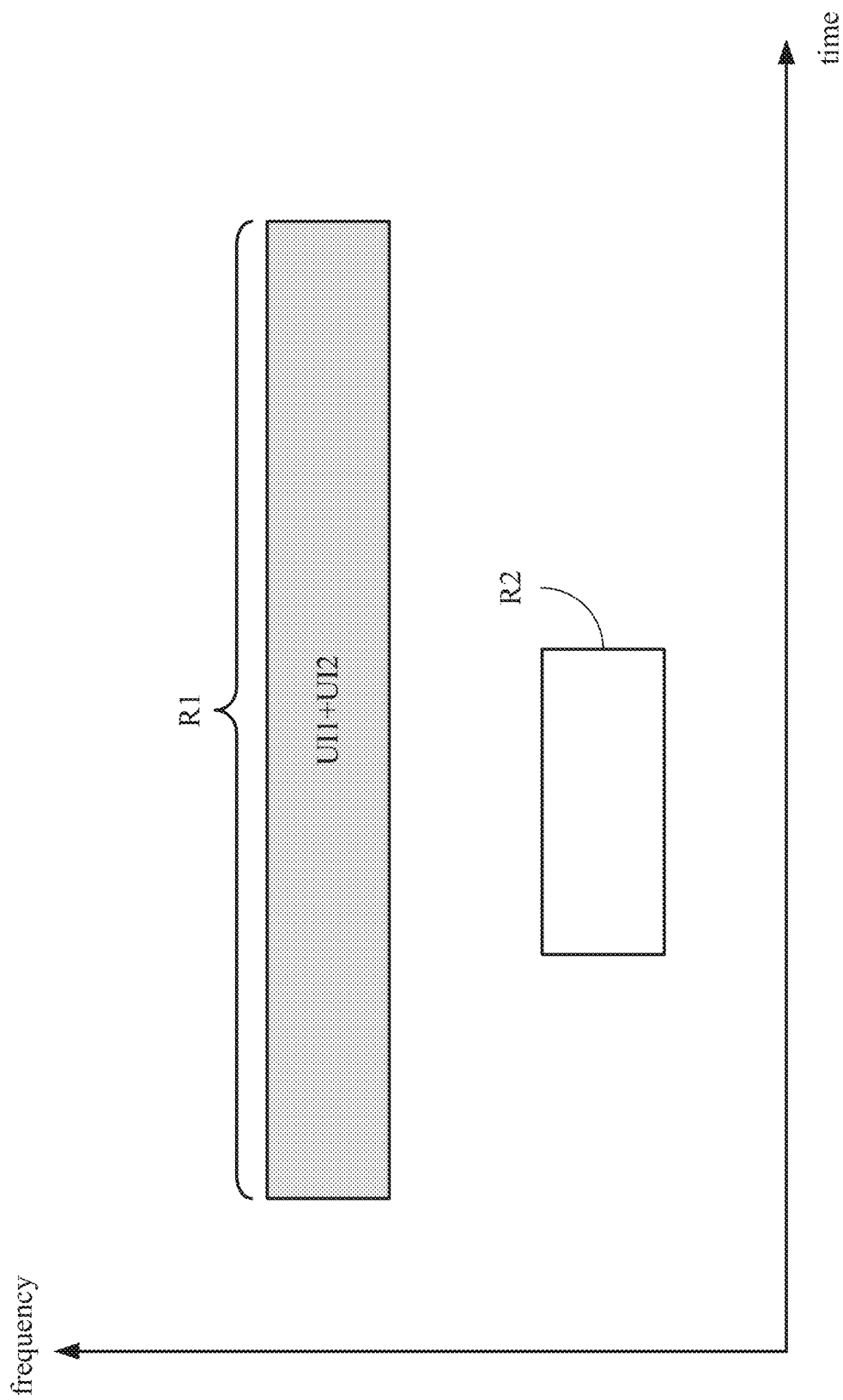

When processing in the PHY layer, the UE 1 determines whether the first uplink information UI1 and the second uplink information UI2 can be jointly transmitted before transmitting the first uplink information UI1 and the second uplink information UI2. If the first uplink information UI1 and the second uplink information UI2 can be jointly transmitted, the UE 1 determines to transmit the first uplink information UI1 and the second uplink information UI2 on one of the first PUCCH resource R1 and the second PUCCH resource R2 according to the format of the first PUCCH resource R1 and the format of the second PUCCH resource R2 (i.e., according to the PUCCH format). For example, as shown in FIG. 1B, the first uplink information UI1 and the second uplink information UI2 are jointly transmitted on the first PUCCH resource R1. In another example, the first uplink information UI1 and the second uplink information UI2 are jointly transmitted on the second PUCCH resource R2.

Figure 1C:
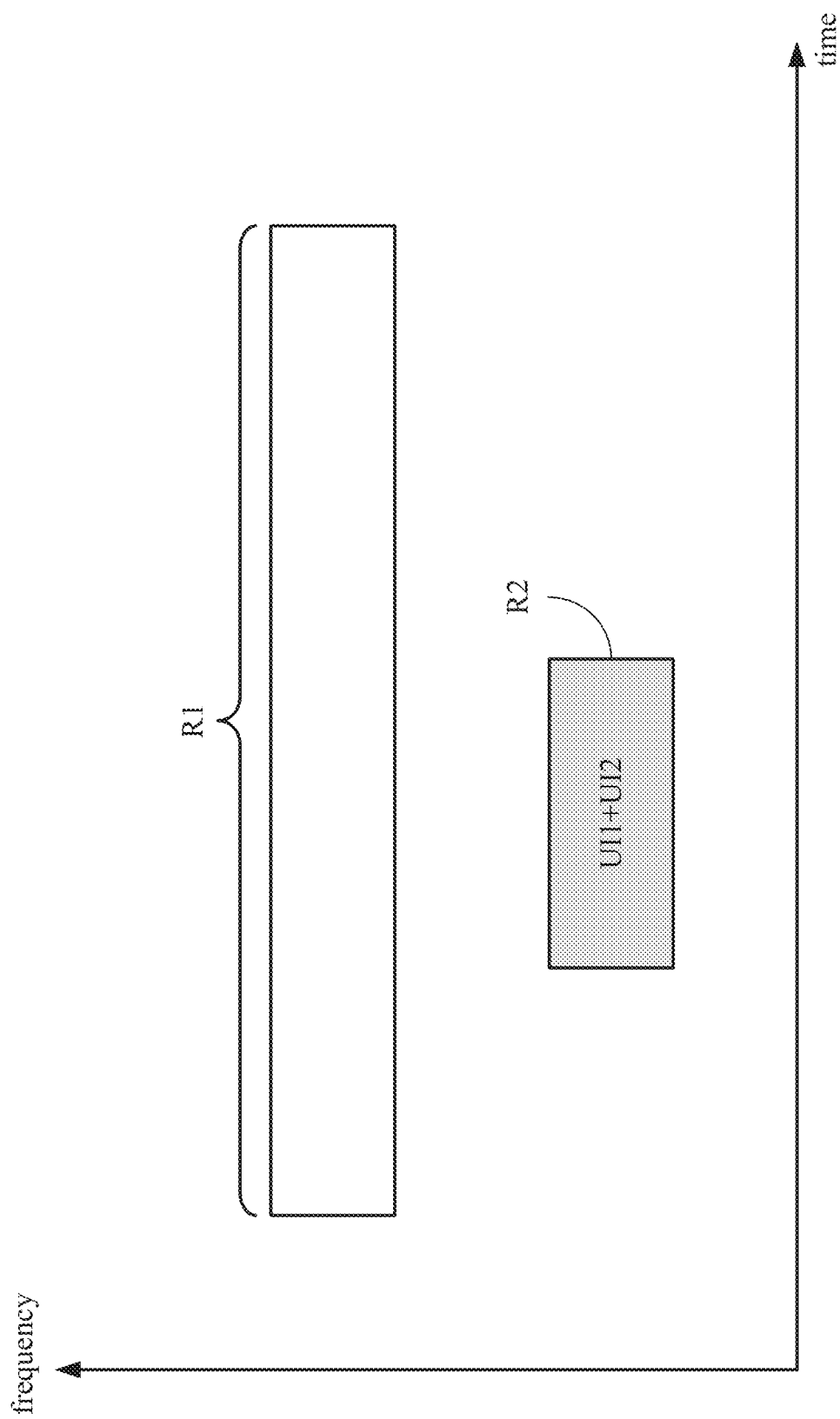
Figure 1D:
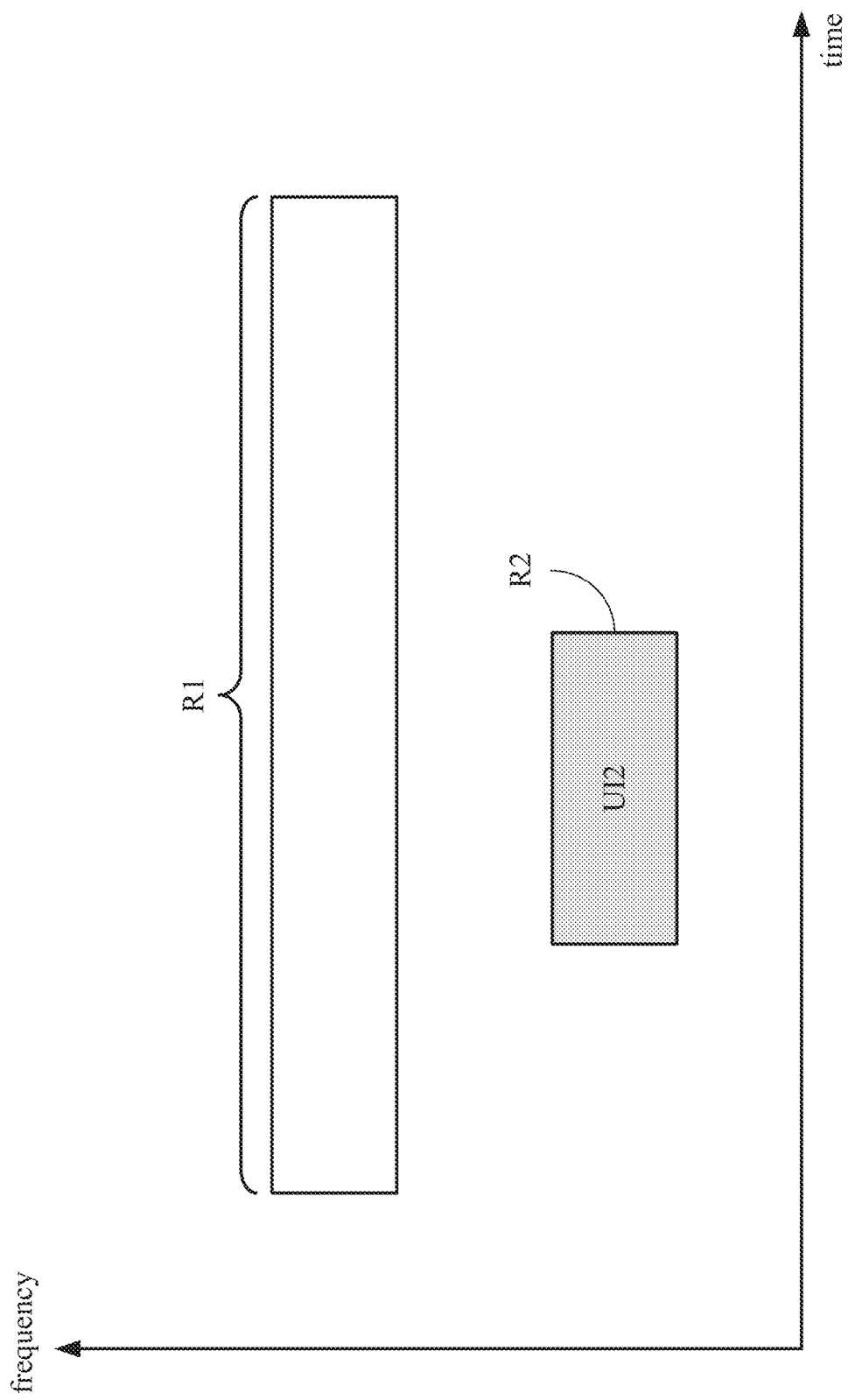

If the UE1 determines that the first PUCCH resource R1 and the second PUCCH resource R2 are overlapped with each other in the time domain and the first PUCCH resource R1 and the second PUCCH resource R2 belong to different groups, then the UE 1 only forwards the uplink information with the higher priority to the PHY layer. For example, if the second uplink information UI2 has the higher priority, the UE 1 forwards the second uplink information UI2 to the PHY layer and transmits the second uplink information UI2 on the corresponding second PUCCH resource R2, as shown in FIG. 1D.

When the first uplink information UI1 has been forwarded to the PHY layer and the second uplink information UI2 still in the MAC layer, if the UE 1 determines that the first PUCCH resource R1 and second PUCCH resource R2 overlap with each other in the time domain and the first uplink information UI1 is transmitting, no matter the first PUCCH resource R1 and the second PUCCH resource R2 belong to the same group or not, the UE 1 should further determine the priorities between the first uplink information UI1 and the second uplink information UI2 to decide whether to forward the second uplink information UI2 to the PHY layer.

Figure 1E:
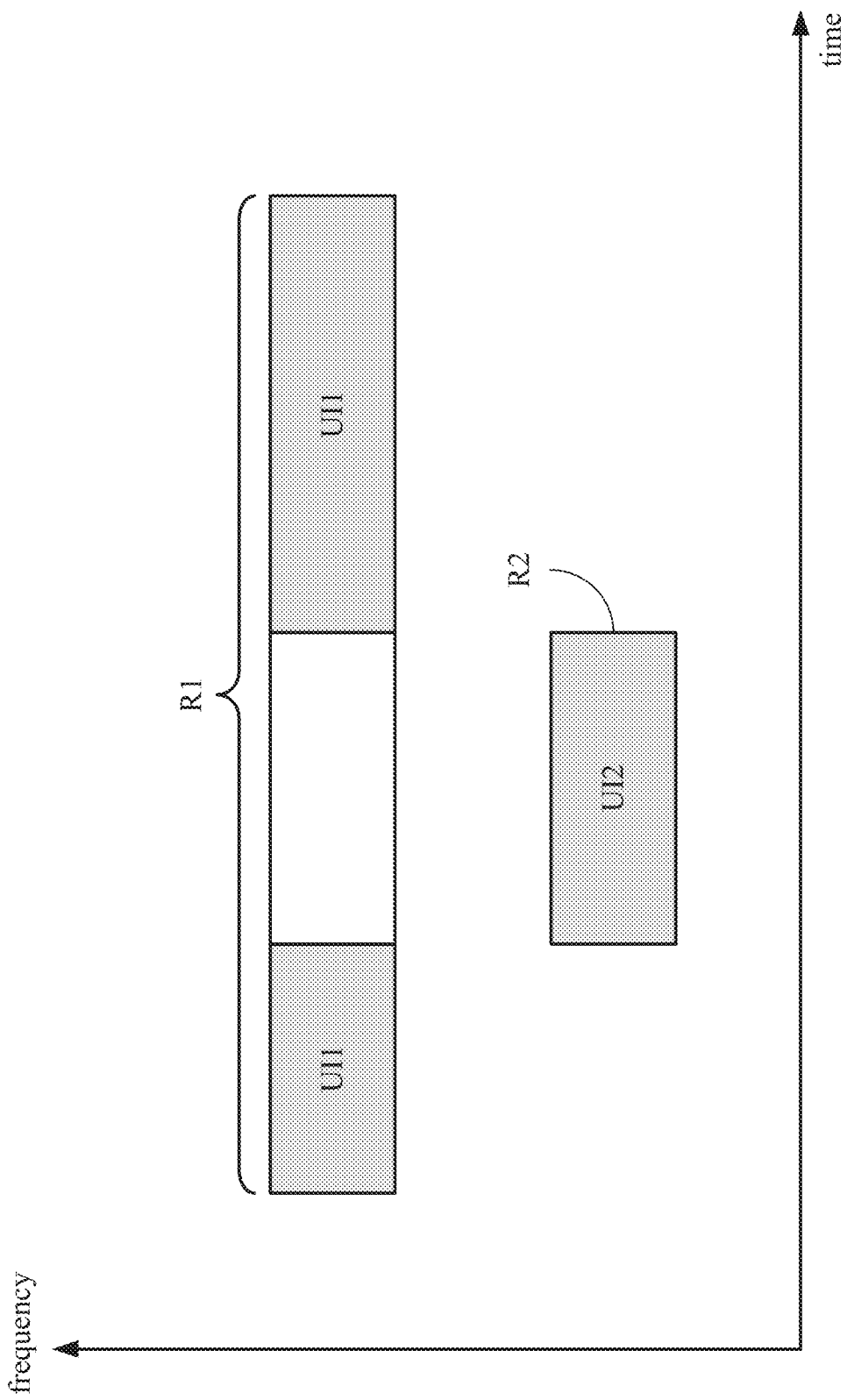
Figure 1F:
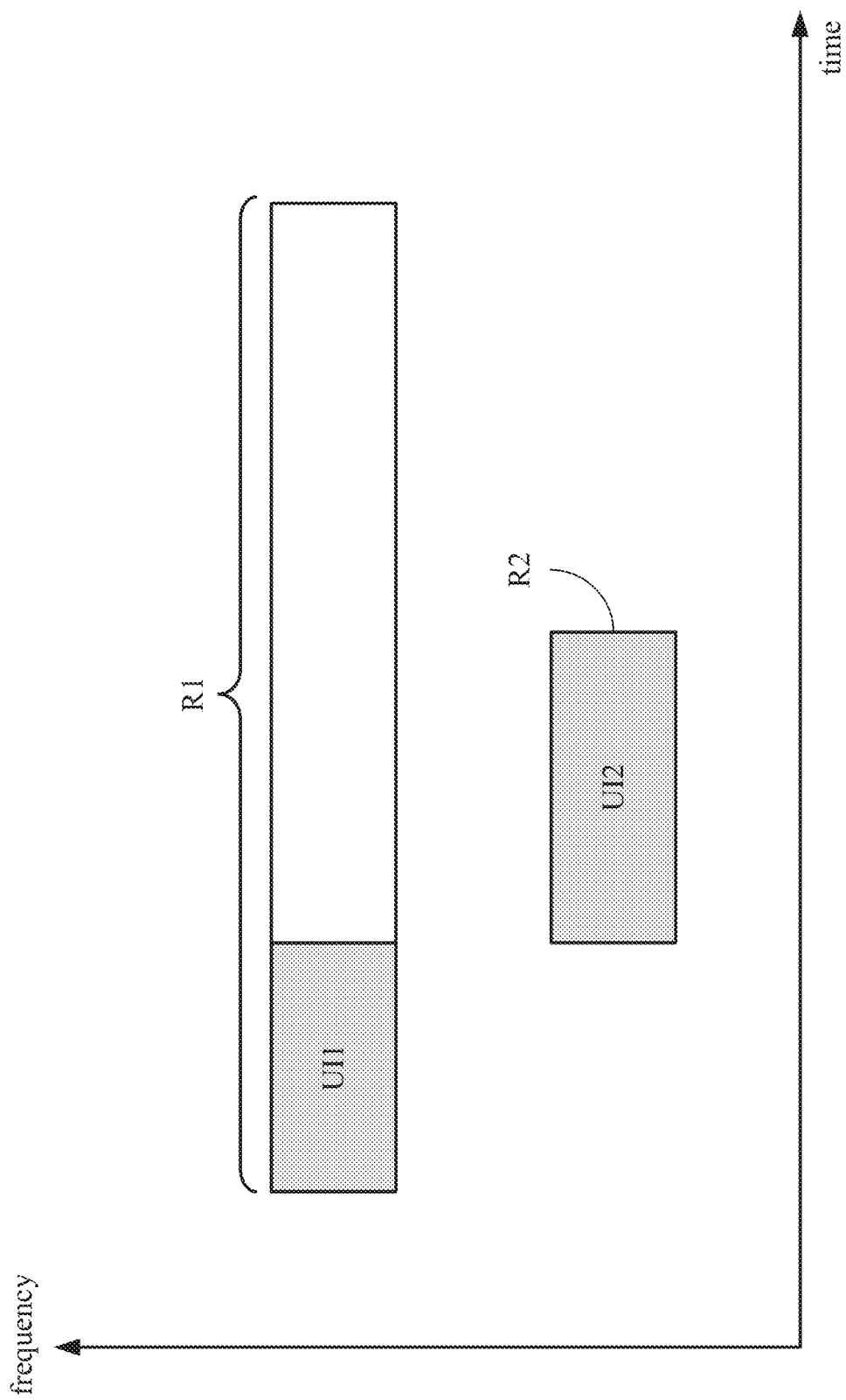

When the priority of the second uplink information UI2 is higher than the first uplink information UI1, the UE 1 forwards the second uplink information UI2 from the MAC layer to the PHY layer, interrupts the transmission of the first uplink information UI1 on the first PUCCH resource R1, and transmits the second uplink information UI2 on the second PUCCH resource R2, as shown in FIGS. 1E and 1F. Moreover, after finishing transmitting the second uplink information UI2 on the second PUCCH resource R2, the UE 1 may continue to transmit the first uplink information UI1 on the first PUCCH resource R1, as shown in FIG. 1E. In addition, if the priority of the second uplink information UI2 is lower than the first uplink information UI1, the UE 1 will not forward the second uplink information UI2 from the MAC layer to the PHY layer (i.e., the second uplink information UI2 would be dropped) and only transmits the first uplink information UI1 on the first PUCCH resource R1, as shown in FIG. 1G.

On the other hand, when the first uplink information UI1 is still in the PHY layer and not transmitted yet, the second uplink information UI2 is still in the MAC layer, and the first PUCCH resource R1 and the second PUCCH resource R2 overlap with each other in the time domain, if the UE 1 determines that the first PUCCH resource R1 and the second PUCCH resource R2 belong to the same group, the UE 1 forwards the second uplink information UI2 to the PHY layer. While processing in the PHY layer, the UE 1 would determine whether the first uplink information UI1 and the second uplink information UI2 can be jointly transmitted. If the first uplink information UI1 and the second uplink information UI2 can be jointly transmitted, the transmission of the first uplink information UI1 and the second uplink information UI2 will be proceeded as shown in FIGS. 1B and 1C. If the first uplink information UI1 and the second uplink information UI2 cannot be jointly transmitted, the transmission of the first uplink information UI1 the second uplink information UI2 will proceeded as shown in FIG. 1D.

If the first PUCCH resource R1 and the second PUCCH resource R2 belong to different groups, the UE 1 further determines that priorities between the first uplink information UI1 and the second uplink information UI2. When the priority of the second uplink information UI2 is higher than the first uplink information UI1, the UE 1 forwards the second uplink information UI2 from the MAC layer to the PHY layer and only transmits the second uplink information UI2 on the second PUCCH resource R2, as shown in FIG. 1D. When the priority of the second uplink information UI2 is lower than the first uplink information UI1, the UE 1 does not forward the second uplink information UI2 from the MAC layer to the PHY layer and only transmits the first uplink information UI1 on the first PUCCH resource R1, as shown in FIG. 1G.

The UE 1 determines whether the first PUCCH resource R1 and the second PUCCH resource R2 overlap with each other after the first uplink information UI1 and the second uplink information UI2 have been successively forwarded from the MAC layer to the PHY layer. If the overlap exists, the first uplink information UI1 has been transmitted, and the second uplink information UI2 is not transmitted yet, no matter the UE 1 determines whether the first PUCCH resource R1 and the second PUCCH resource R2 belong to the same group or not in the PHY layer, the UE 1 interrupts the transmission of the first uplink information UI1 on the first PUCCH resource R1 and transmits the second uplink information UI2 on the second PUCCH resource R2 as long as the priority of the second uplink information UI2 is higher than the first uplink information UI1, as shown in FIGS. 1E and 1F. If the priority of the second uplink information UI2 is lower than the first uplink information UI1, the UE 1 drops the second uplink information UI2 and only transmits the first uplink information UI1 on the first PUCCH R1, as shown in FIG. 1G.

However, when the overlap exists and both of the first uplink information UI1 and the second uplink information UI2 are not transmitted yet, the UE 1 further determines whether the first PUCCH resource R1 and the second PUCCH resource R2 belong to the same group and determines whether the first uplink information UI1 and the second uplink information UI2 can be jointly transmitted if there is enough time to process the first uplink information UI1 and the second uplink information UI2 in the PHY layer (i.e., under the circumstance that the time for encoding the first uplink information UI1 and the second uplink information UI2 together is permissible). If the first uplink information UI1 and the second uplink information UI2 belong to the same group and can be jointly transmitted, the UE 1 decides to transmit the first uplink information UI1 and the second uplink information UI2 on the first PUCCH resource R1 according to the format of the first PUCCH resource R1 and the second PUCCH resource R2, as shown in FIG. 1B. If the first PUCCH resource R1 and the second PUCCH resource R2 belong to different groups, the UE 1 only transmits the second uplink information UI2 with the higher priority and drops the first uplink information UI1, as shown in FIG. 1D.

Figure 1H:
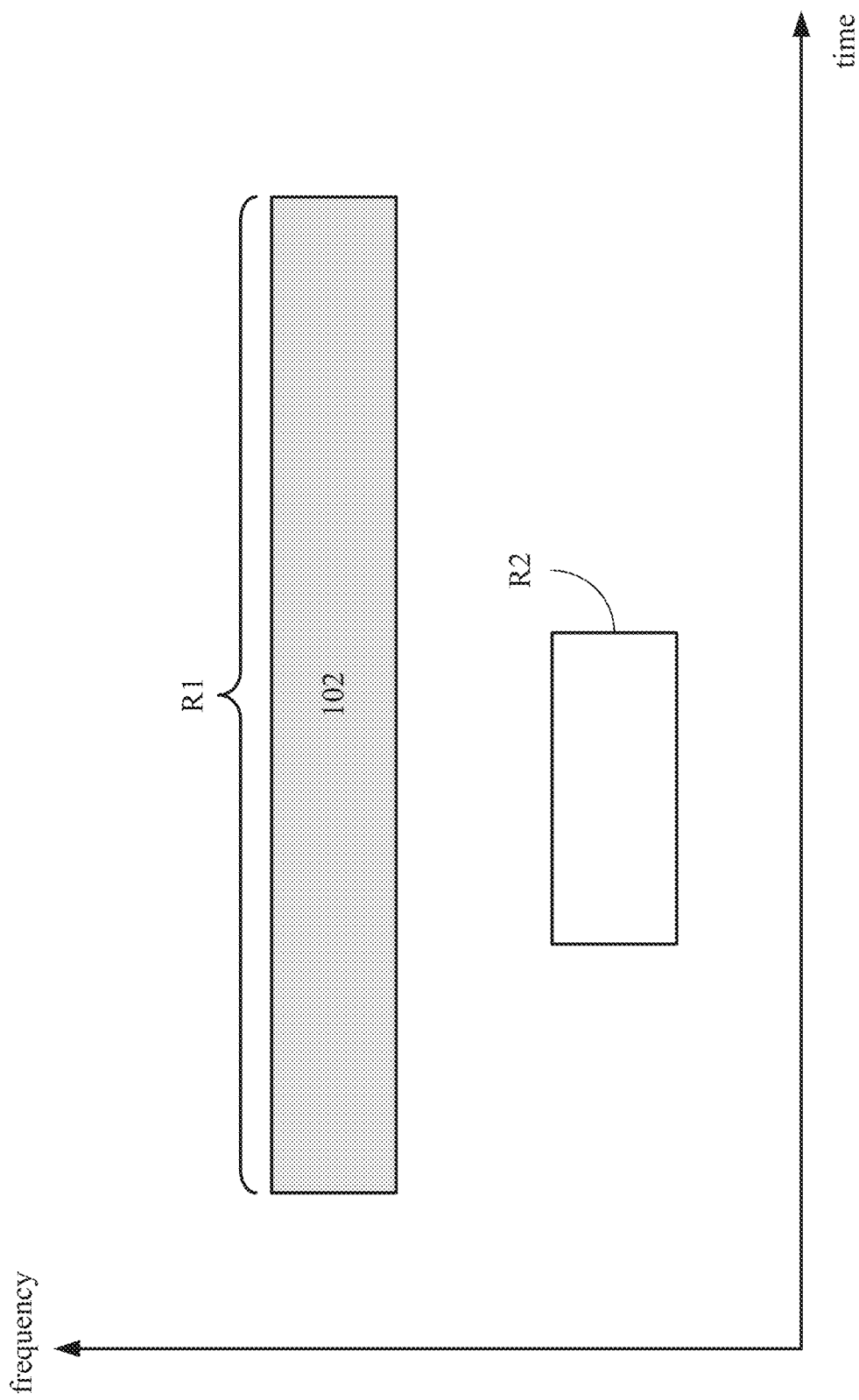

At the side of the BS 2, the BS 2 also divides the configured and scheduled PUCCH resources into the at least one group and determines whether there exist the overlapped period OP between the first PUCCH resource R1 and the second PUCCH resource R2 in the time domain. The BS 2 keeps monitoring these PUCCH resources. The BS 2 decides how to process the received signal according to whether the first PUCCH resource R1 and the second PUCCH resource R2 belong to the same group and whether the first uplink information UI1 and the second uplink information UI2 can be jointly transmitted. When the first PUCCH resource R1 and the second PUCCH resource R2 belong to the same group and the first uplink information UI1 and the second uplink information UI2 can be jointly transmitted on the first PUCCH resource R1, if the BS 2 only receives the first uplink signal 102 (as shown in FIG. 1H) on the first PUCCH resource R1, it assumes that there are two possible situations: (1) the first uplink signal 102 carries both of the first uplink information UI1 and the second uplink information UI2 (i.e., the situation as shown in FIG. 1B); and (2) the first uplink signal 102 only carries the first uplink information UI1 (i.e., the situation as shown in FIG. 1G). Therefore, the BS 2 needs to demodulate and decode the first uplink signal 102 for the two situations individually.

In addition, when the first PUCCH resource R1 and the second PUCCH resource R2 belong to the same group and the first uplink information UI1 and the second uplink information UI2 can be jointly transmitted on the second PUCCH resource R2, if the BS 2 only receives a second uplink signal 104 on the second PUCCH resource R2 (as shown in FIG. 1I), it assumes that there are two situations: (1) the second uplink signal 104 carries both of the first uplink information UI1 and the second uplink information UI2 (i.e., the situation as shown in FIG. 1C); and (2) the second uplink signal 104 only carries the second uplink information UI2 (i.e., the situation as shown in FIG. 1D).

Therefore, the BS 2 needs to demodulate and decode the second uplink signal 104 for the two situations individually.

Figure 1J:
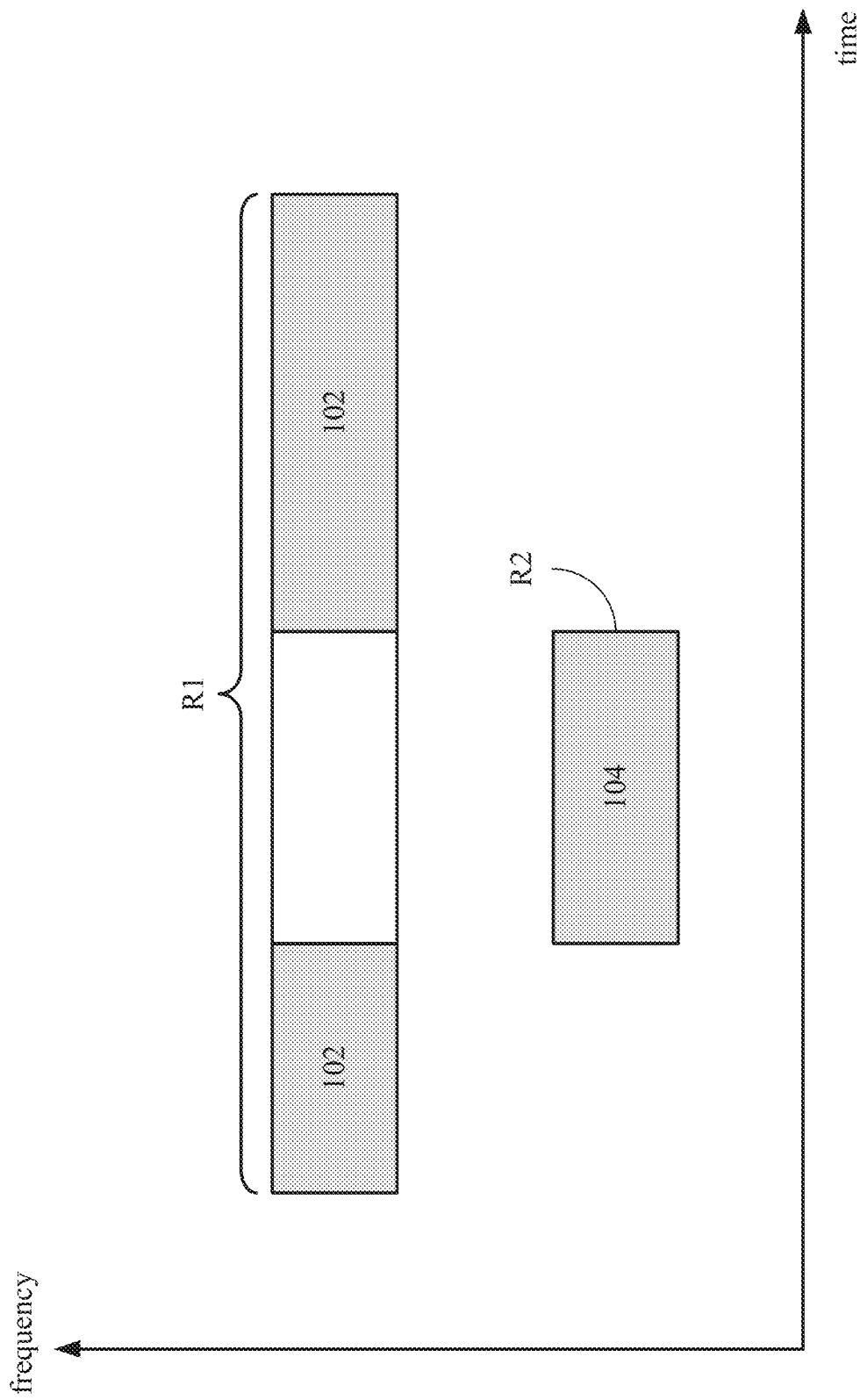

On the other hand, when the first PUCCH resource R1 and the second PUCCH resource R2 belong to different groups (i.e., the first uplink information UI1 and the second uplink information UI2 cannot be jointly transmitted) and the second uplink information UI2 has the higher priority (the situations as shown in FIGS. 1E and 1F), if the BS 2 receives the first uplink signal 102 on the first PUCCH resource R1 and receives the second uplink signal 104 on the second PUCCH resource R2 (as shown in FIGS. 1J and 1K), the BS 2 demodulates and decodes the second uplink signal 104 to obtain the second uplink information UI2. Furthermore, in the situation shown in FIG. 1K (i.e., corresponds to the situation as shown in FIG. 1E), since the first uplink information UI1 may be encoded with a low code rate, the BS 2 may try to demodulate and decode the first uplink signal 102 to obtain the first uplink information UI1.

Figure 2:
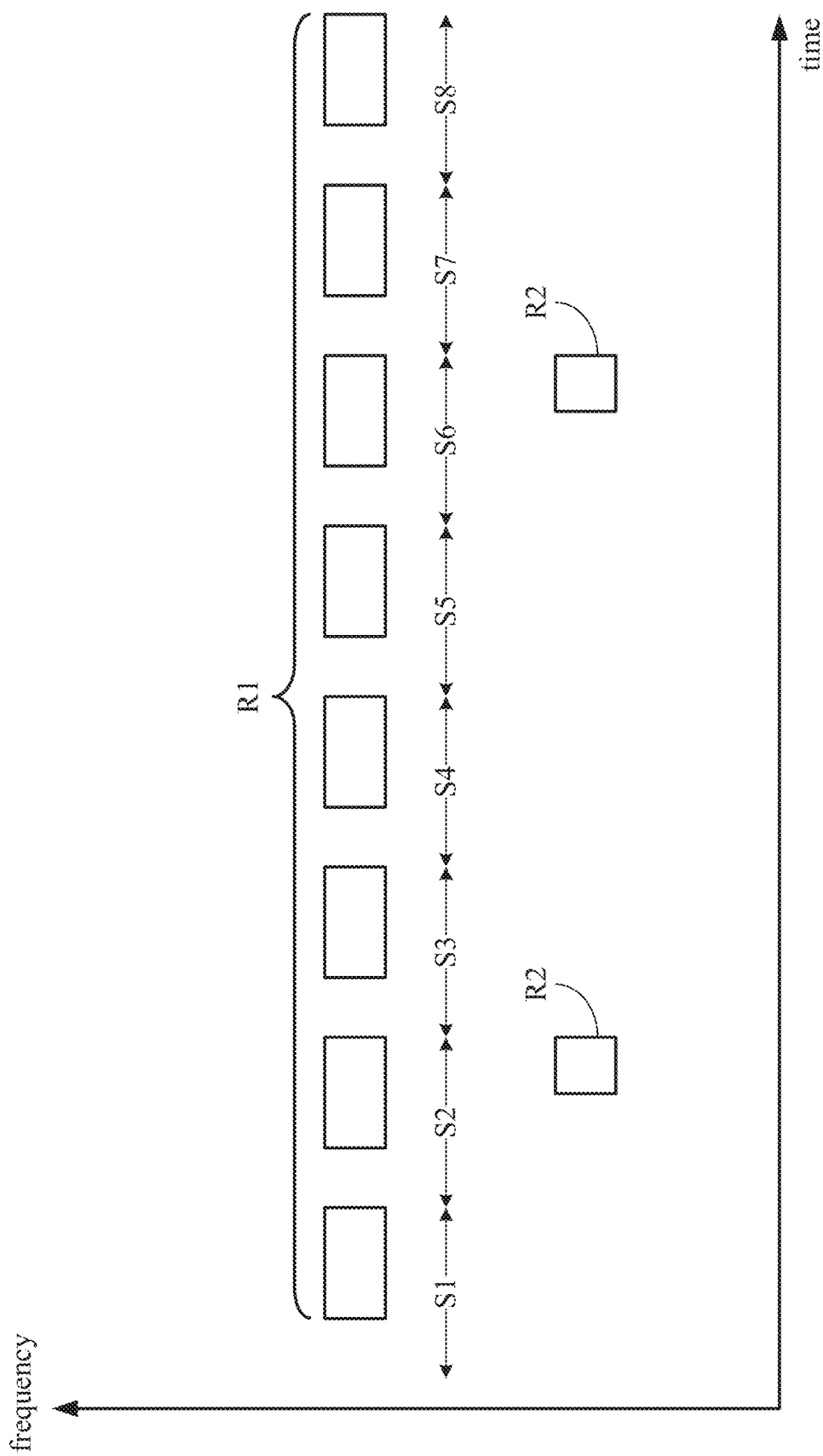
FIG. 2 depicts an implementation scenario of information transmission in multiple slots according to the present invention.

A second embodiment of the present invention is as shown in FIGS. 1B-1G and FIG. 2. FIG. 2 depicts an implementation scenario of information transmission in multiple slots according to the present invention. The second embodiment is an extension of the first embodiment. In this embodiment, the first PUCCH resource R1 is configured to exist in the slot S1 to the slot S8, and the second PUCCH resource R2 is configured to exist in the slot S2 and the slot S6 (i.e., the period of the second PUCCH resource is 4 slots). When there exists the overlapped period OP between the first PUCCH resource R1 and the second PUCCH resource R2 in the slot S2 and the slot S6, the UE 1 may decide how to transmit the first uplink information UI1 and the second uplink information UI2 according to the determination rule described in the first embodiment.

For example, it is assumed that the first uplink information UI1 is an HARQ-ACK and the second uplink information UI2 is an SR. When the UE 1 is going to transmit the first uplink information UI1 and the second uplink information UI2 in the slot S2 and the slot S6, if the second uplink information UI2 has the high priority and the first uplink information UI1 and the second uplink information UI2 cannot be jointly transmitted, then the UE 1 only transmits the second uplink information UI2 on the second PUCCH resource R2 in the slot S2 and the slot S6 without transmitting the first uplink information UI1 on the first PUCCH resource R1. In other words, the UE 1 may only transmit the first uplink information UI1 on the first PUCCH resource R1 in the slots S1, S3-S5, S7-S8.

It shall be noted that, the priority decision is made according to at least one of an information type, the logical channel which each of the uplink radio resources corresponds to, a resource periodicity and a resource overlapping condition. The information type may include the SR, the CSI and the HARQ-ACK, but not limited thereto. The priority of the information type is usually set by the BS 2 according to the system status, and the BS 2 informs the UE 1 about the priority through a high layer signaling, e.g., the SR may have the higher priority or the CSI transmitted on the scheduled PUCCH resource may have the higher priority. Each of the PUCCH resources corresponds to a logical channel, and each of the logical channels corresponds to a service type, e.g., the URLLC service, the eMBB service and the mMTC service, but not limited thereto. The logical channel which corresponds to the URLLC service type usually has a higher priority. The resource periodicity refers to the period that the PUCCH resource is configured to exist. The resource periodicity may be slot-based or symbol-based. The PUCCH resource with a lower period usually has a higher priority.

Figure 3A:
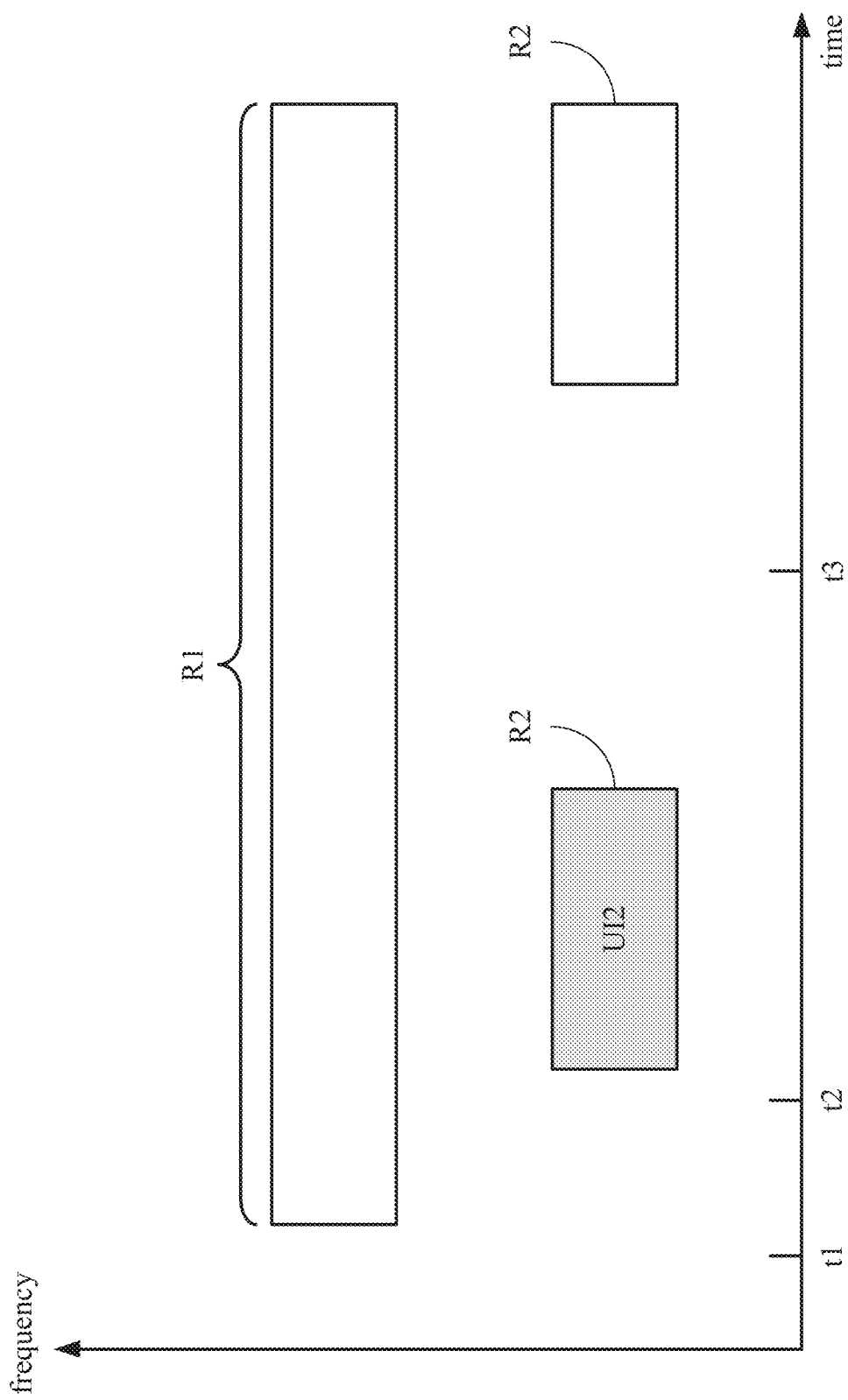
FIGS. 3A-3E depict implementation scenarios of information transmission according to the present invention.
Figure 3B:
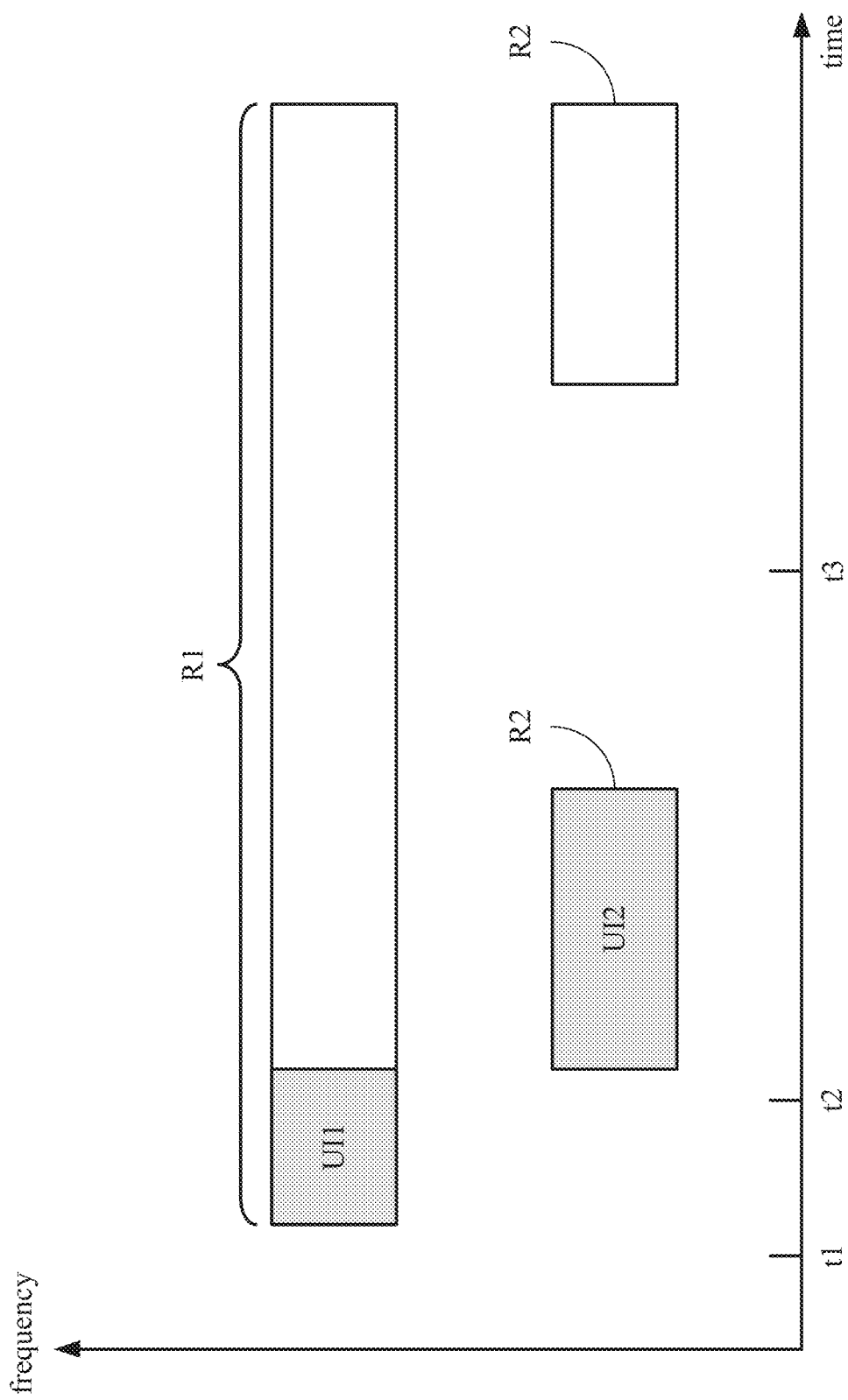
Figure 3C:
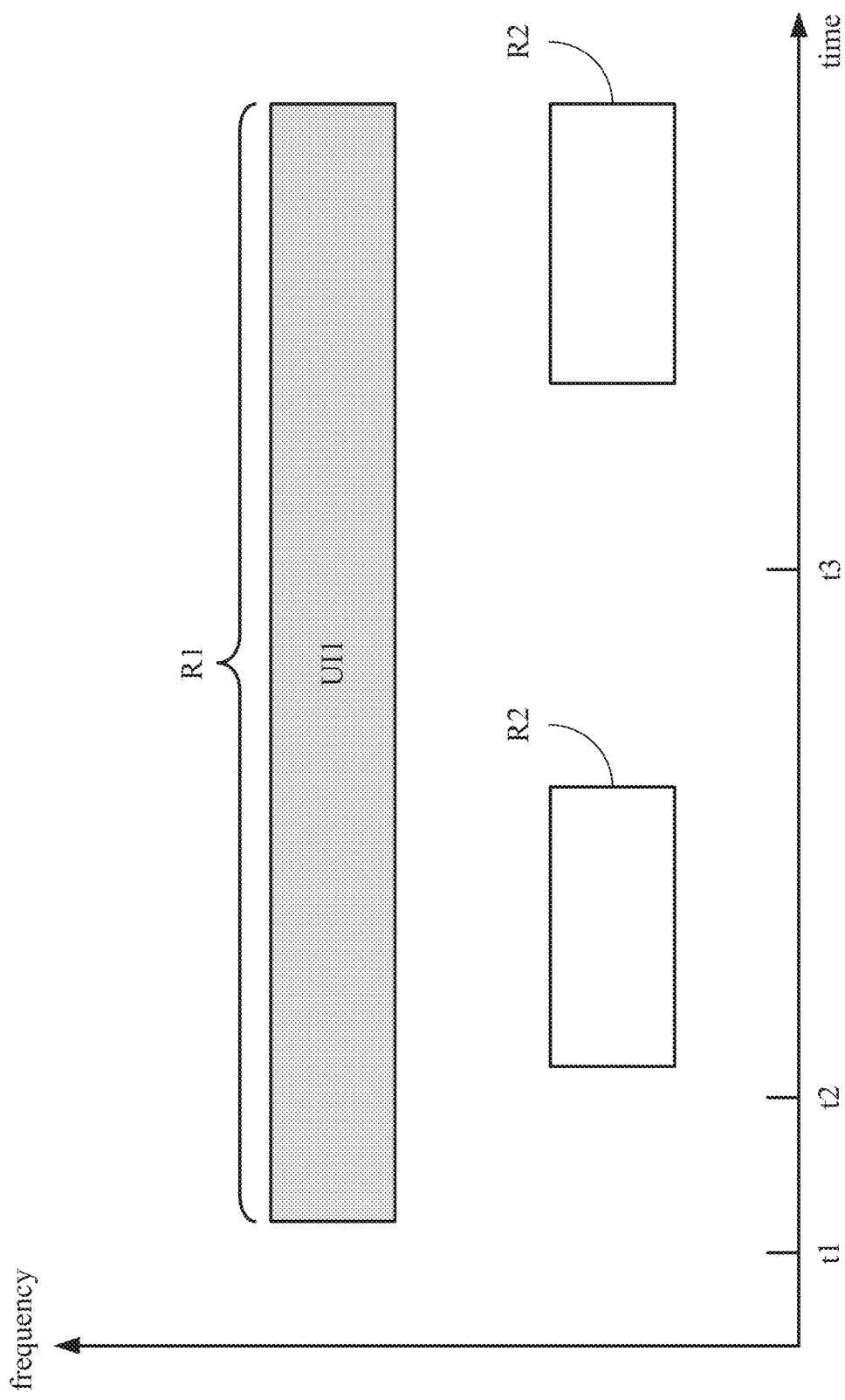

The third embodiment of the present invention is as shown in FIGS. 3A-3C. The third embodiment is an extension of the first embodiment. As shown in FIG. 3A, in response to the second uplink information UI2 being triggered to be transmitted at a trigger time point, the UE 1 in this embodiment determines whether the first PUCCH resource R1 overlaps at least two the second PUCCH resources R2 in the time domain after the trigger time point. When the overlapped period exists and the first PUCCH resource R1 overlaps at least two the second PUCCH resources R2 in the time domain, the UE 1 further determines that the second uplink information UI2 has the high priority.

For example, please refer to FIGS. 3A-3C, if the second uplink information UI2 is triggered to be transmitted at the trigger time point t1 or the trigger time point t2, the UE 1 determines that the first PUCCH resource R1 overlaps two second PUCCH resources R2 in the time domain so that the priority of the second uplink information UI2 is higher than the first uplink information UI1. At the trigger time point t1, since the first uplink information UI1 is not transmitted yet, the UE 1 will stop proceeding to transmit the first uplink information UI1 (e.g., the HARQ-ACK) and only transmits the second uplink information UI2 (e.g., the SR) on the second PUCCH resource R2 if the first uplink information UI1 and the second uplink information UI2 can not be jointly transmitted (e.g., the format of the first PUCCH resource R1 is format 1 and the format of the second PUCCH resource R2 is format 0), as shown in FIG. 3A. At the trigger point t2, since the first uplink information UI1 is transmitting on the first PUCCH resource R1, the UE 1 needs to interrupt the transmission of the first uplink information UI1 on the first PUCCH resource R1 first and then transmits the second uplink information UI2 on the second PUCCH resource R2, as shown in FIG. 3B.

As shown in FIG. 3C, if the second uplink information UI2 is triggered to be transmitted at the trigger time point t3, the UE 1 has no chance to transmit the second uplink information UI2 on the second PUCCH resource R2 between the time point t2 and the time point t3, so the UE 1 determines that the first PUCCH resource R1 only overlaps one second PUCCH resource R2 in the time domain and consequently determines that the first uplink information UI1 has the high priority. In detail, if the first PUCCH resource R1 only overlaps one PUCCH resource R2 in the time domain, it means that the priority of the first PUCCH resource R1 is the same as the priority of the second PUCCH resource R2. However, since the first uplink information UI1 is triggered to be transmitted first, the UE 1 will determine that the first uplink information UI1 has the higher priority.

Figure 4A:
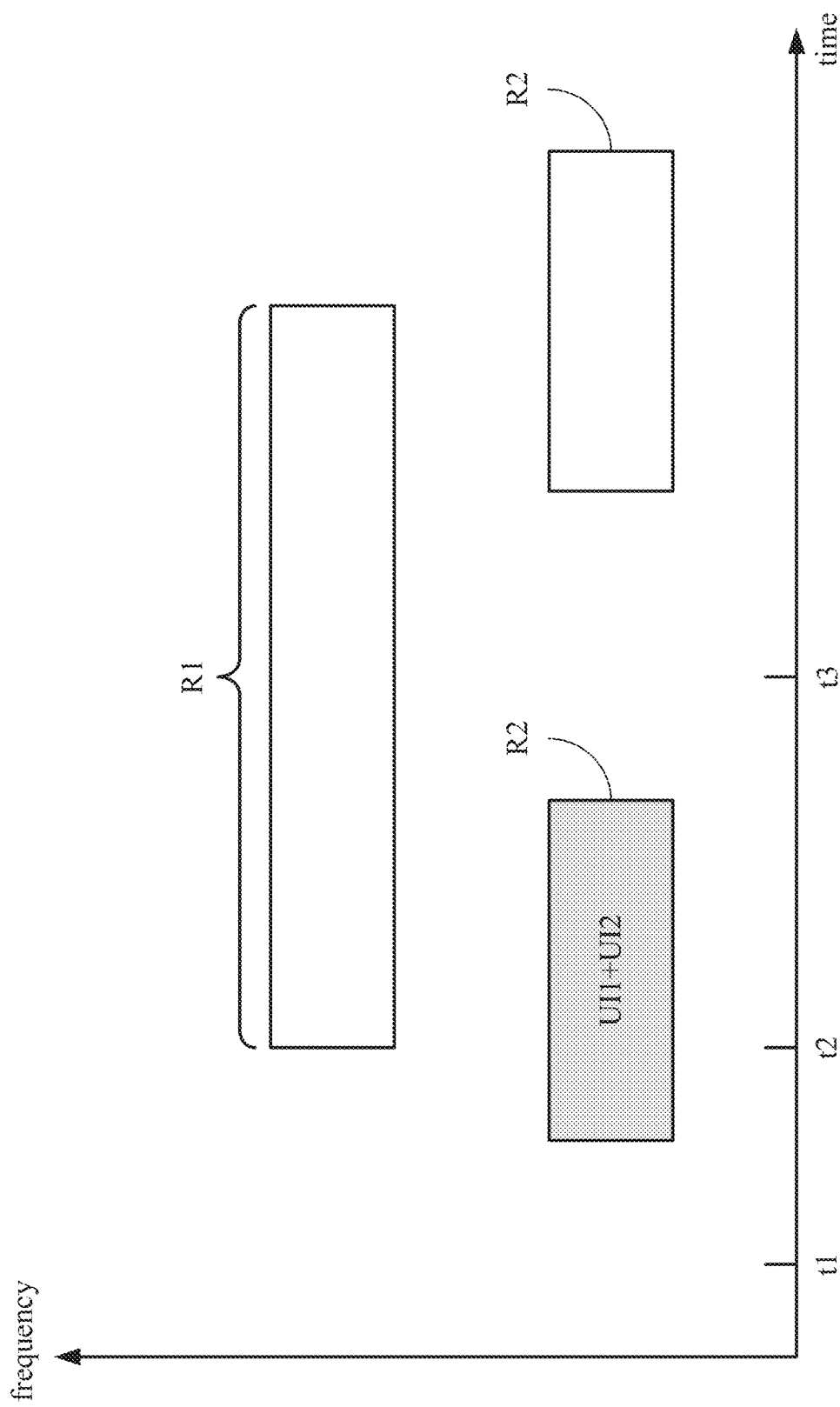
FIGS. 4A-4B depict implementation scenarios of information transmission according to the present invention.
Figure 4B:
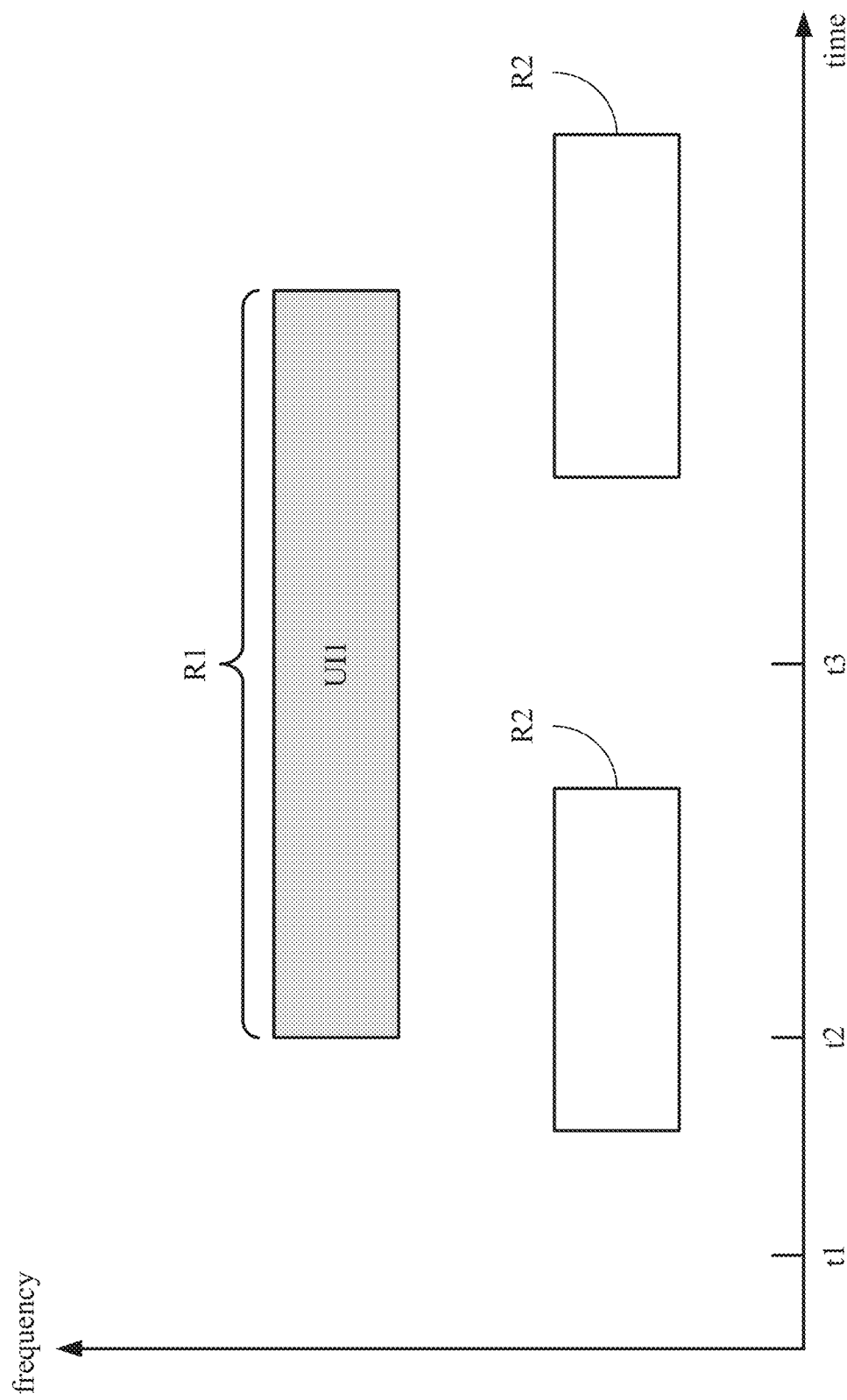

The fourth embodiment of the present invention is as shown in FIGS. 4A-4B. The fourth embodiment is an extension of the first embodiment. Likewise, in this embodiment, in response to the second uplink information UI2 being triggered to be transmitted at a trigger time point, the UE 1 also determines whether the first PUCCH resource R1 overlaps at least two the second PUCCH resources R2 in the time domain after the trigger time point to determine the first uplink information UI1 and the second uplink information UI2 which has the higher priority.

For example, as shown in FIG. 4A, at the trigger time point t1, since the first PUCCH resource R1 overlaps two second PUCCH resources R2 in the time domain and the first uplink information UI1 and the second uplink information UI2 are not transmitted yet, the UE 1 determines that the second uplink information UI2 has the higher priority. If the first uplink information UI1 and the second uplink information UI2 can be jointly transmitted (e.g., the format of the first PUCCH resource R1 is format 1 and the format of the second PUCCH resource R2 is format 1), the UE 1 transmits the first uplink information UI1 and the second uplink information UI2 on the second PUCCH resource R2.

In addition, if the second uplink information UI2 is triggered to be transmitted at the trigger time point t2, since the UE 1 has no chance to transmit the second uplink information UI2 on the second PUCCH resource R2 between the time point t1 and the time point t3, the UE 1 determines that the first PUCCH resource R1 only overlaps one second PUCCH resource R2 in the time domain and further determines that the first uplink information UI1 has the high priority so that the UE 1 transmits the first uplink information UI1 on the first PUCCH resource R1, as shown in FIG. 4B.

Figure 3D:
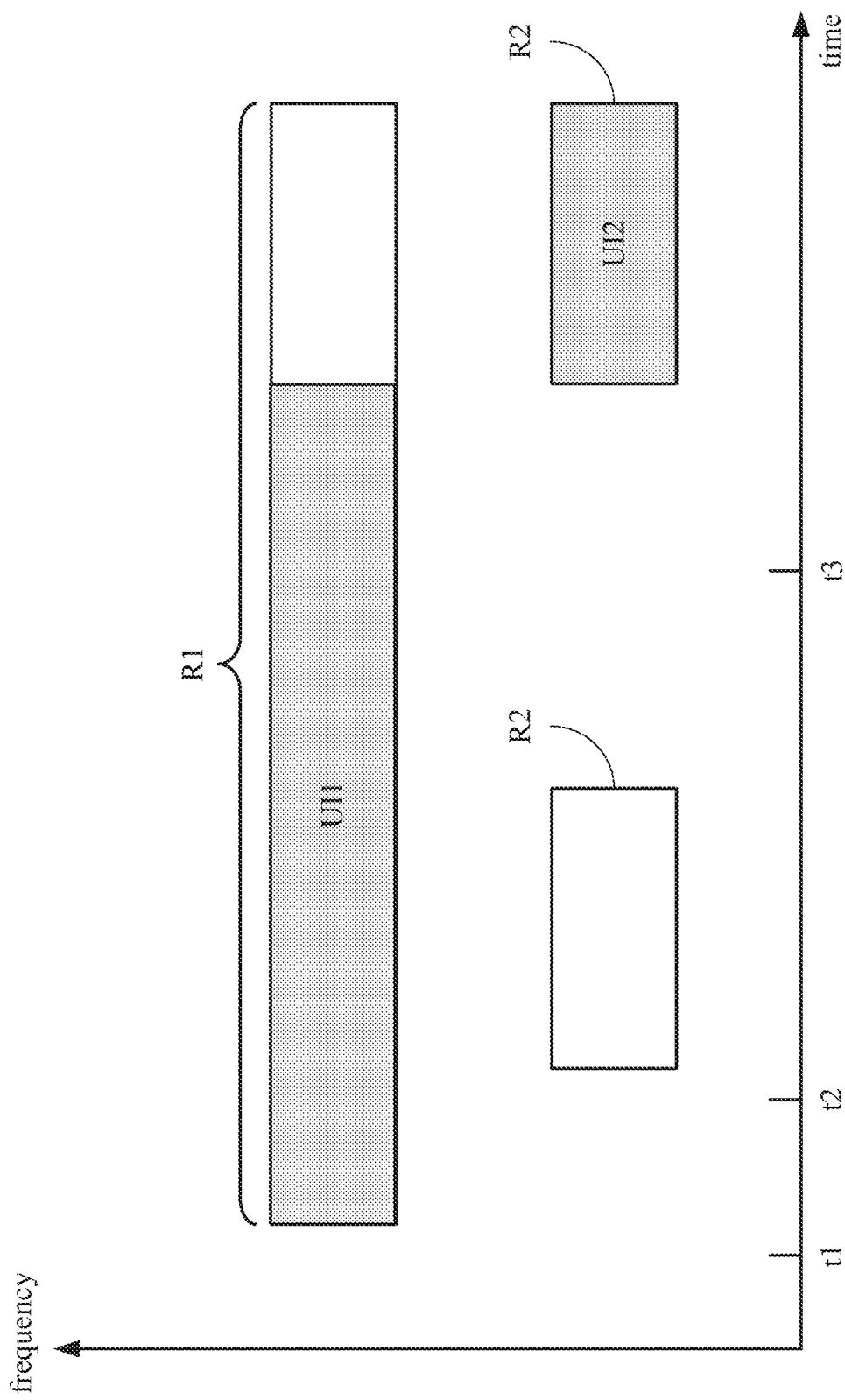

The fifth embodiment of the present invention is as shown in FIGS. 3A-3B and 3D. In this embodiment, in response to the second uplink information UI2 being triggered to be transmitted at a trigger time point, the UE 1 determines that the second PUCCH resource R2 is a periodic radio resource and corresponds to a first logical channel with a first priority, and determines that the first PUCCH resource R1 is a scheduled uplink radio resource and corresponds to a second logical channel with a second priority. When the overlapped period exists, the UE 1 further determines that the second uplink information UI2 has the high priority.

For example, the first logical channel corresponds to the URLLC service, the second logical channel corresponds to the eMBB service, the first uplink information UI1 is the HARQ-ACK, and the second uplink information UI2 is the SR. In this case, since the first PUCCH resource R1 and the second PUCCH resource R2 correspond to different logical channels, they belong to different groups. Hence, the UE 1 determines that the first uplink information UI1 and the second uplink information UI2 cannot be jointly transmitted, and determines that the second uplink information UI2 has the high priority since the first logical channel corresponds to the URLLC service.

If the second uplink information UI2 is triggered at the trigger time point t1 and the first uplink information UI1 is not transmitted yet, the UE 1 will stop proceeding to transmit the first uplink information UI1 and only transmit the second uplink information UI2 on the second PUCCH resource R2, as shown in FIG. 3A. At the trigger time point t2, the UE 1 is transmitting the first uplink information UI1 on the first PUCCH resource R1, so the UE 1 has to interrupt the transmission of the first uplink information UI1, and transmits the second uplink information UI2 on the second PUCCH resource R2, as shown in FIG. 3B.

If the second uplink information UI2 is triggered to be transmitted at the trigger time point t3, the UE 1 has no chance to transmit the second uplink information UI2 on the second PUCCH resource R2 between the time point t2 and the time point t3. In this case, the UE 1 has to interrupt the transmission of the first uplink information UI1, and then transmits the second uplink information UI2 on the second PUCCH resource R2, as shown in FIG. 3D.

Figure 3E:
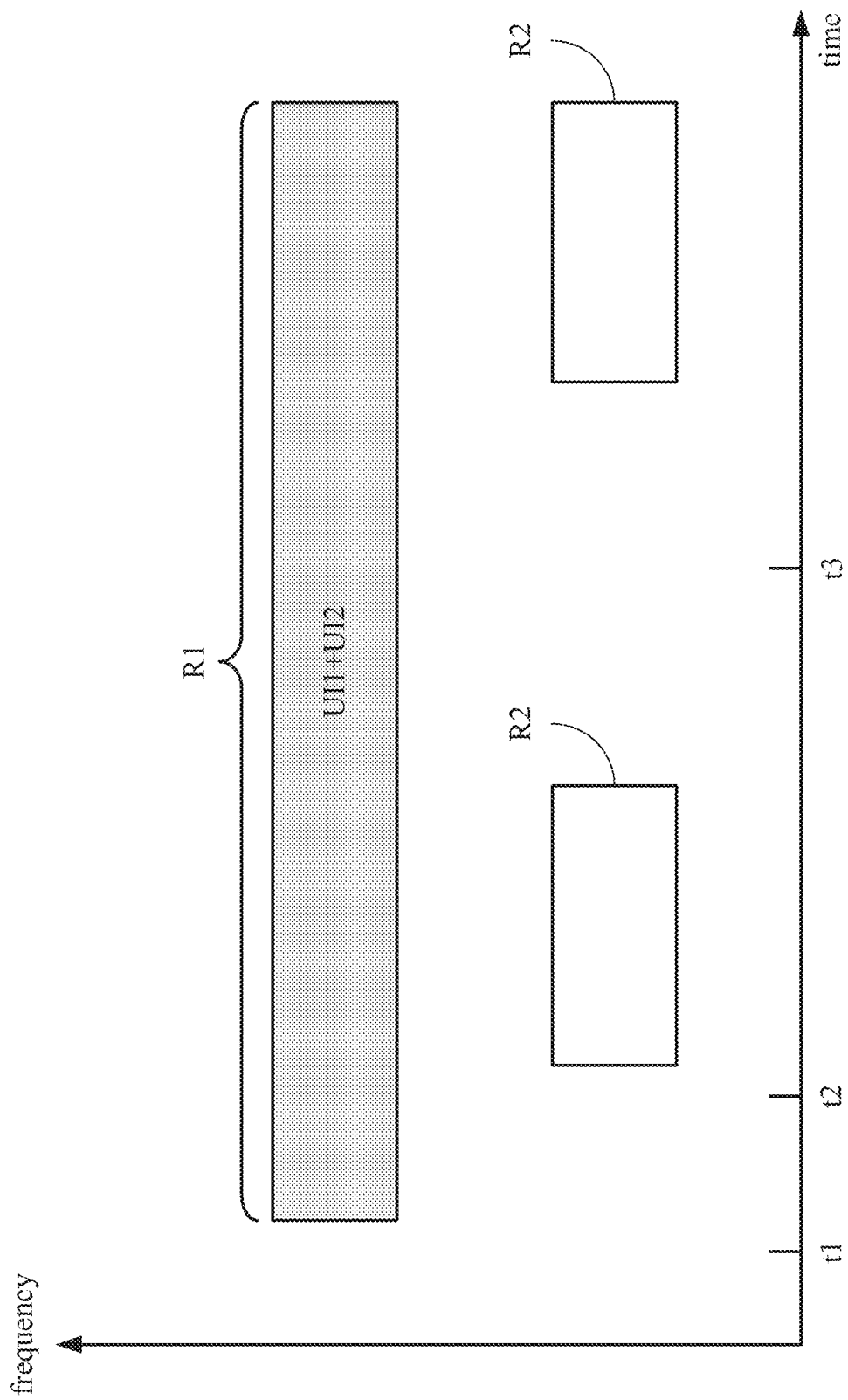

Please also refer to FIGS. 3C and 3E for the sixth embodiment. In this embodiment, in response to the second uplink information UI2 being triggered to be transmitted at a trigger time point, the UE 1 determines that the first PUCCH resource R1 is a periodic radio resource and corresponds to a first logical channel with a first priority, and determines that the second PUCCH resource R2 is a scheduled uplink radio resource and corresponds to the first logical channel with the first priority. When the overlapped period exists, the UE 1 further determines that the second uplink information UI2 has the high priority.

For example, the first logical channel corresponds to the URLLC service, the first uplink information UI1 is an HARQ-ACK and the second uplink information UI2 is an SR. In this case, since the first PUCCH resource R1 and the second PUCCH resource R2 correspond to the same logical channel, so they belong to the same group. It is assumed that the priority of the scheduled uplink radio resource is higher than the periodic radio resource, so the UE 1 determines that the second uplink information UI2 has the high priority.

The UE 1 determines whether the first uplink information UI1 and the second uplink information UI2 can be jointly transmitted on the first PUCCH resource R1 (e.g., according to the formats of the first PUCCH resource R1 and the second PUCCH resource R2) if the second uplink information UI2 is triggered to be transmitted at the trigger time point t1 and the first uplink information UI1 is not transmitted yet. When the first uplink information UI1 and the second uplink information UI2 can be jointly transmitted on the first PUCCH resource R1, the UE 1 jointly transmits the first uplink information UI1 and the second uplink information UI2 on the first PUCCH resource R1, as shown in FIG. 3E.

When the first uplink information UI1 and the second uplink information UI2 cannot be jointly transmitted on the first PUCCH resource R1, the UE 1 only transmits the first uplink information UI1 on the first PUCCH resource R1, as shown in FIG. 3C. Besides, at the trigger time point t2 and the trigger time point t3, the UE 1 keeps transmitting the first uplink information UI1 on the first PUCH resource R1 without transmitting the second uplink information UI2 on the second PUCCH resource R2 in this slot if the UE 1 is transmitting the first uplink information UI1 on the first PUCCH resource R1, as shown in FIG. 3C.

Figure 5A:
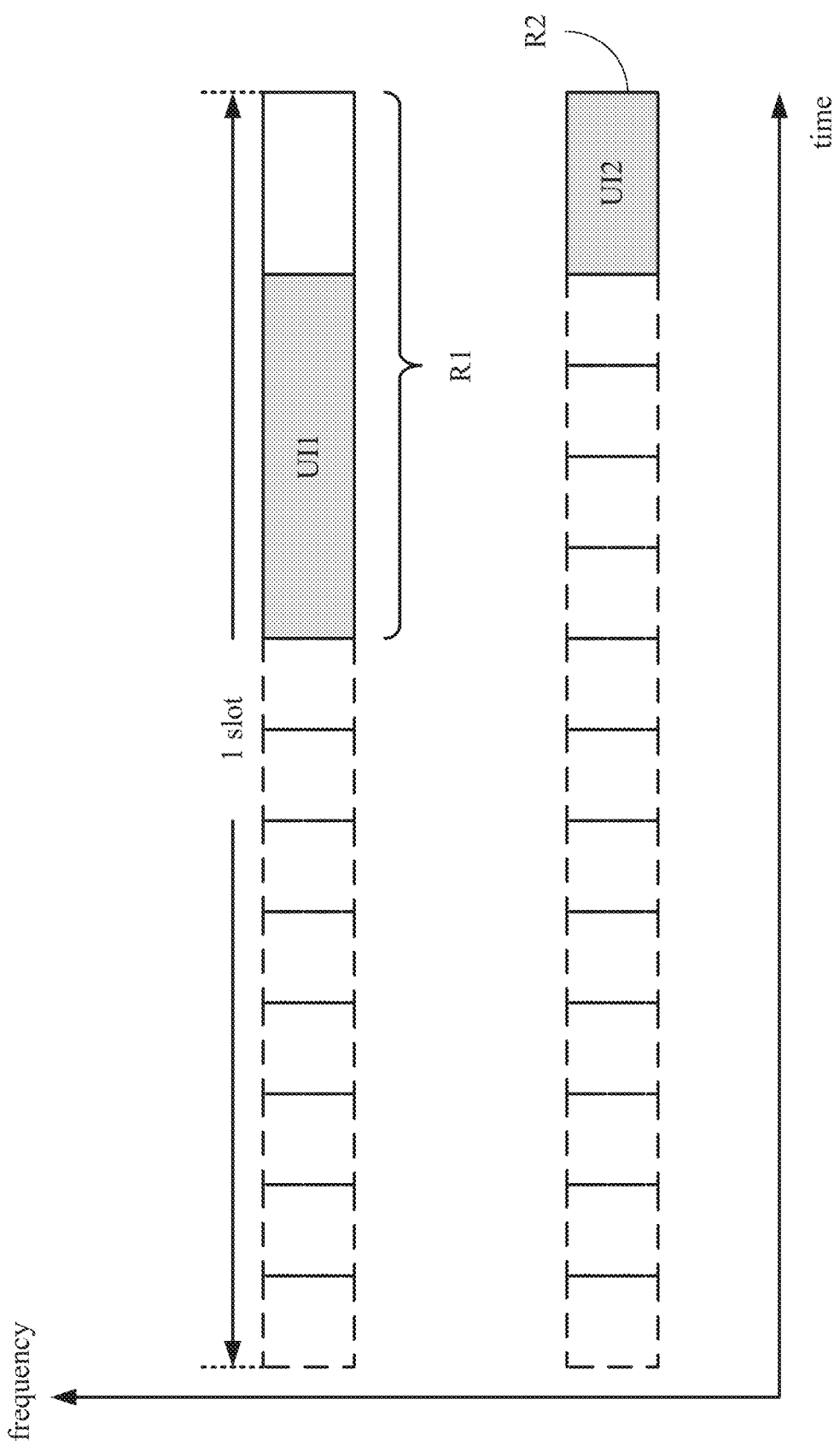
FIGS. 5A-5B depict implementation scenarios of information transmission according to the present invention.
Figure 5B:
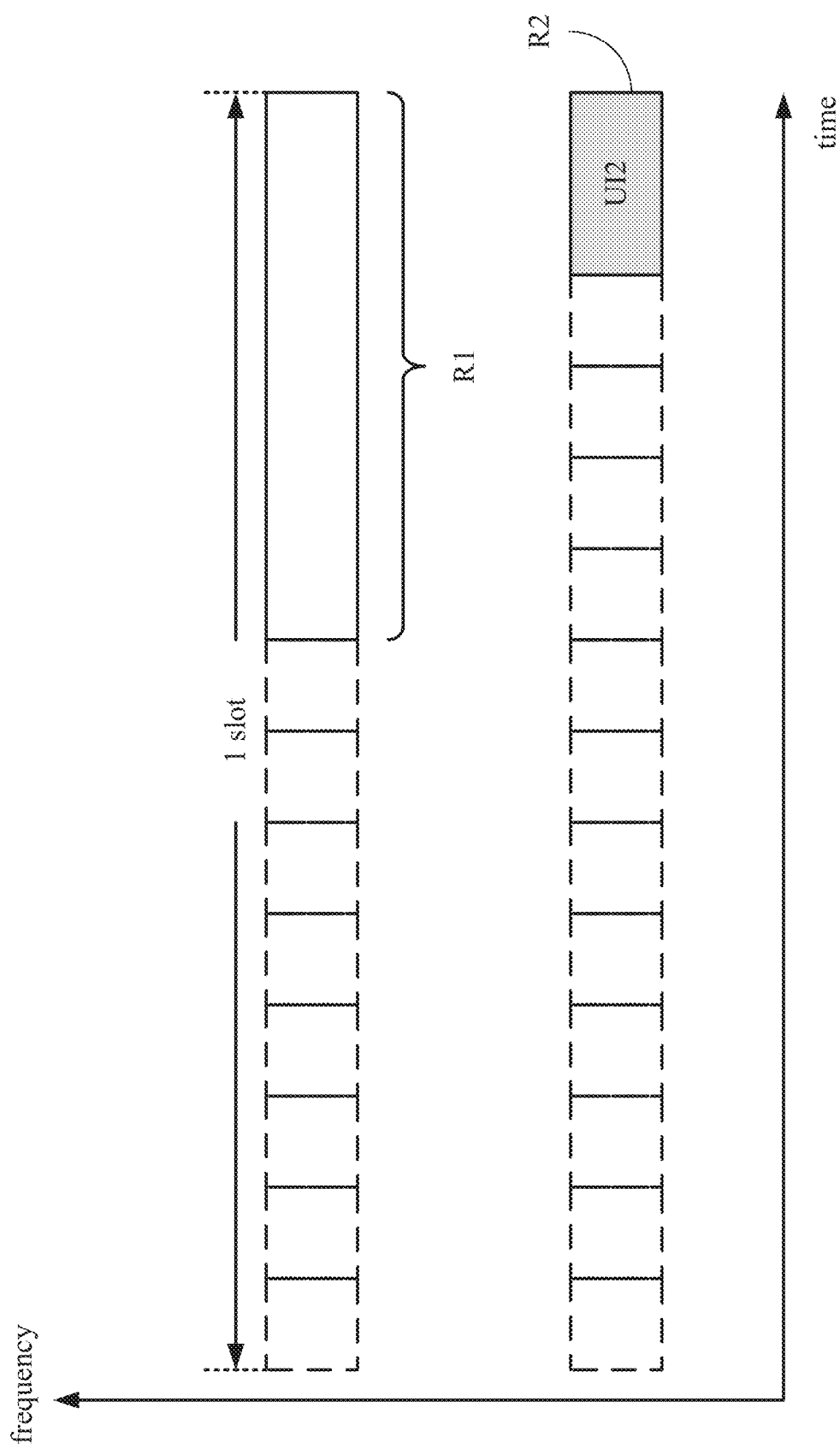

The seventh embodiment is as shown in FIGS. 5A-5B. The seventh embodiment is an extension of the first embodiment. In this embodiment, when the overlapped period exists, the UE 1 determines that the second uplink information UI2 has a high priority based on the first uplink information UI1 belongs to a first service type (e.g., the aforementioned eMBB service) and the second uplink information UI2 belongs to a second service type (e.g., the aforementioned URLLC service). Briefly, in this embodiment, the UE 1 determines the priorities based on the service types of the first uplink information UI1 and the second uplink information UI2. Because of different service types, the first PUCCH resource R1 and the second PUCCH resource R2 belong to different groups and the first uplink information UI1 and the second uplink information UI2 cannot be jointly transmitted. Thus, in this embodiment, the first PUCCH resource R1 is scheduled to carry the uplink information corresponding to the logical channel with a lower priority, and the second PUCCH resource R2 is scheduled to carry the uplink information corresponding to the logical channel with a higher priority.

When the UE 1 is transmitting the first uplink information UI1 on the first PUCCH resource R1, the UE 1 interrupts the transmission of the first uplink information UI1 on the first PUCCH resource R1, and transmits the second uplink information UI2 on the second PUCCH resource R2. If the first uplink information UI1 is not transmitted yet, the UE 1 stops proceeding to transmit the first uplink information UI1 (i.e., the UE 1 drops the first uplink information UI1), and transmits the second uplink information UI2 on the second PUCCH resource R2.

For example, it is assumed that the first uplink information UI1 is an HARQ-ACK of the eMBB service, and the second uplink information UI2 is the HARQ-ACK of the URLLC service, so both of the first PUCCH resource R1 and the second PUCCH resource R2 are the scheduled PUCCH resources. In some situations, because the first PUCCH resource R1 and the second PUCCH resource R2 are improperly scheduled by the BS 2, the overlapped period exists between the first PUCCH resource R1 and the second PUCCH resource R2, e.g., the first PUCCH resource R1 starts at the $9^{th}$ symbol with format 4 and duration of 6 symbols, and the second PUCCH resource R2 starts at the $13^{th}$ symbol with format 4 and duration of 2 symbols. Therefore, when the HARQ-ACK of the eMBB service is transmitting on the first PUCCH resource R1, the UE 1 interrupts the transmission of the HARQ-ACK of the eMBB service on the first PUCCH resource R1 (i.e., not to transmit the HARQ-ACK on the $13^{th}$-$14^{th}$ symbols), and transmits HARQ-ACK of the URLLC service on the second PUCCH resource R2, as shown in FIG. 5A. In this way, the present invention can make sure that the uplink control information with the higher priority can be transmitted to meet the requirement of the URLLC service.

In addition, if the HARQ-ACK of the eMBB service is not transmitted yet, the UE 1 stops proceeding the transmission of the first uplink information UI1, and transmits the HARQ-ACK of the URLLC service on the second PUCCH resource R2, i.e., the UE 1 drops the HARQ-ACK of the eMBB service, as shown in FIG. 5B.

Figure 6A:
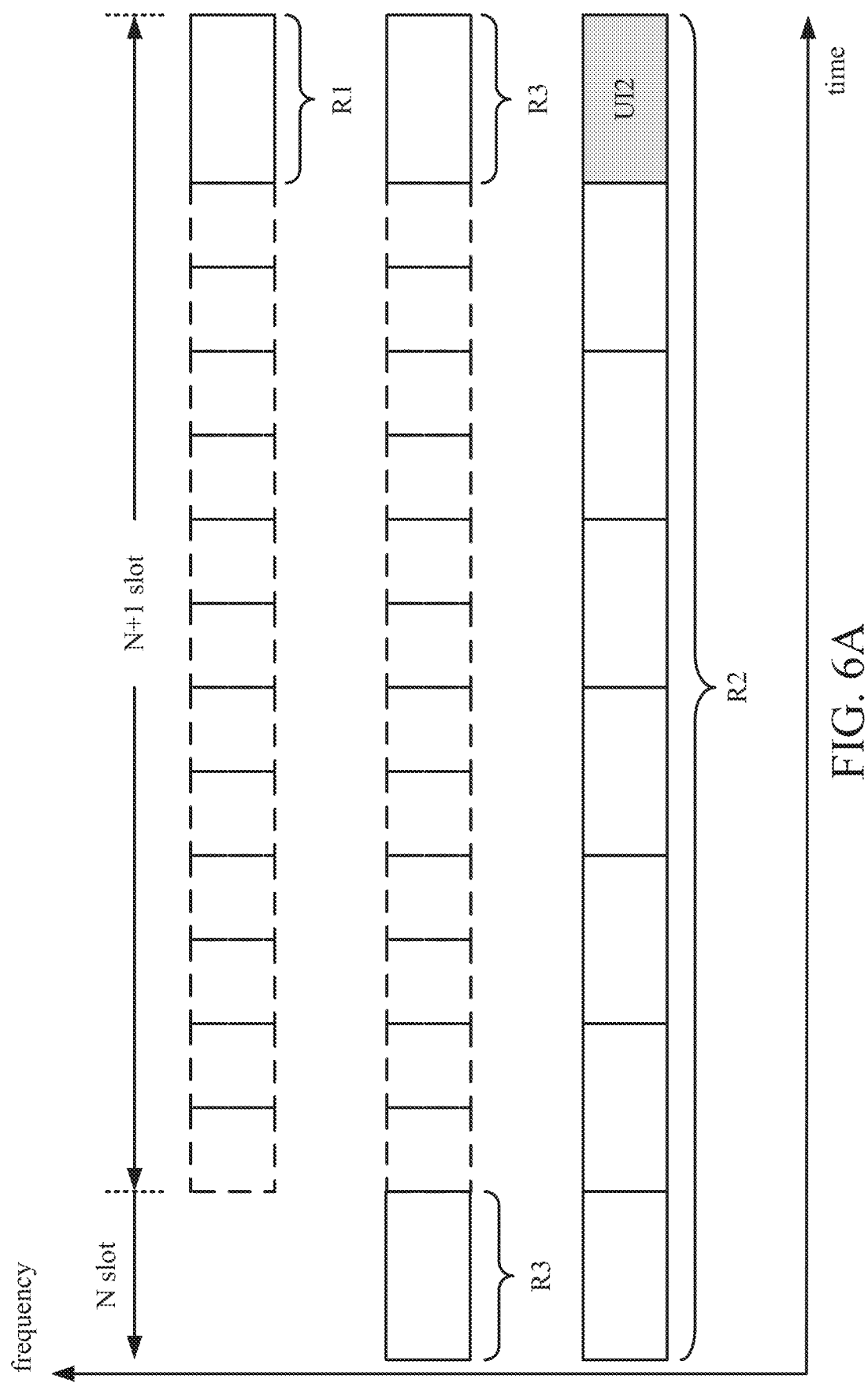
FIGS. 6A-6B depict implementation scenarios of information transmission according to the present invention.
Figure 6B:
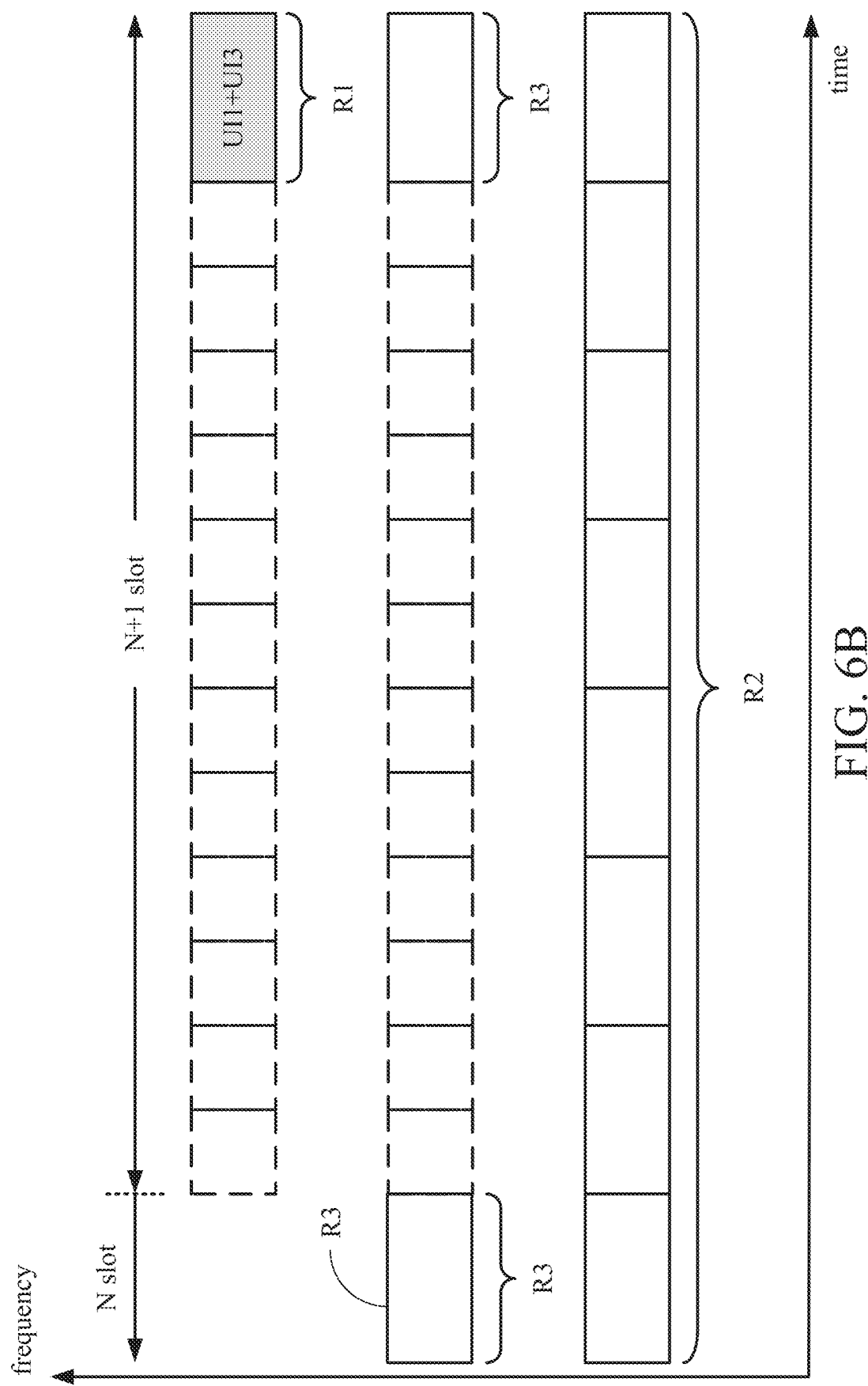
Figure 7:
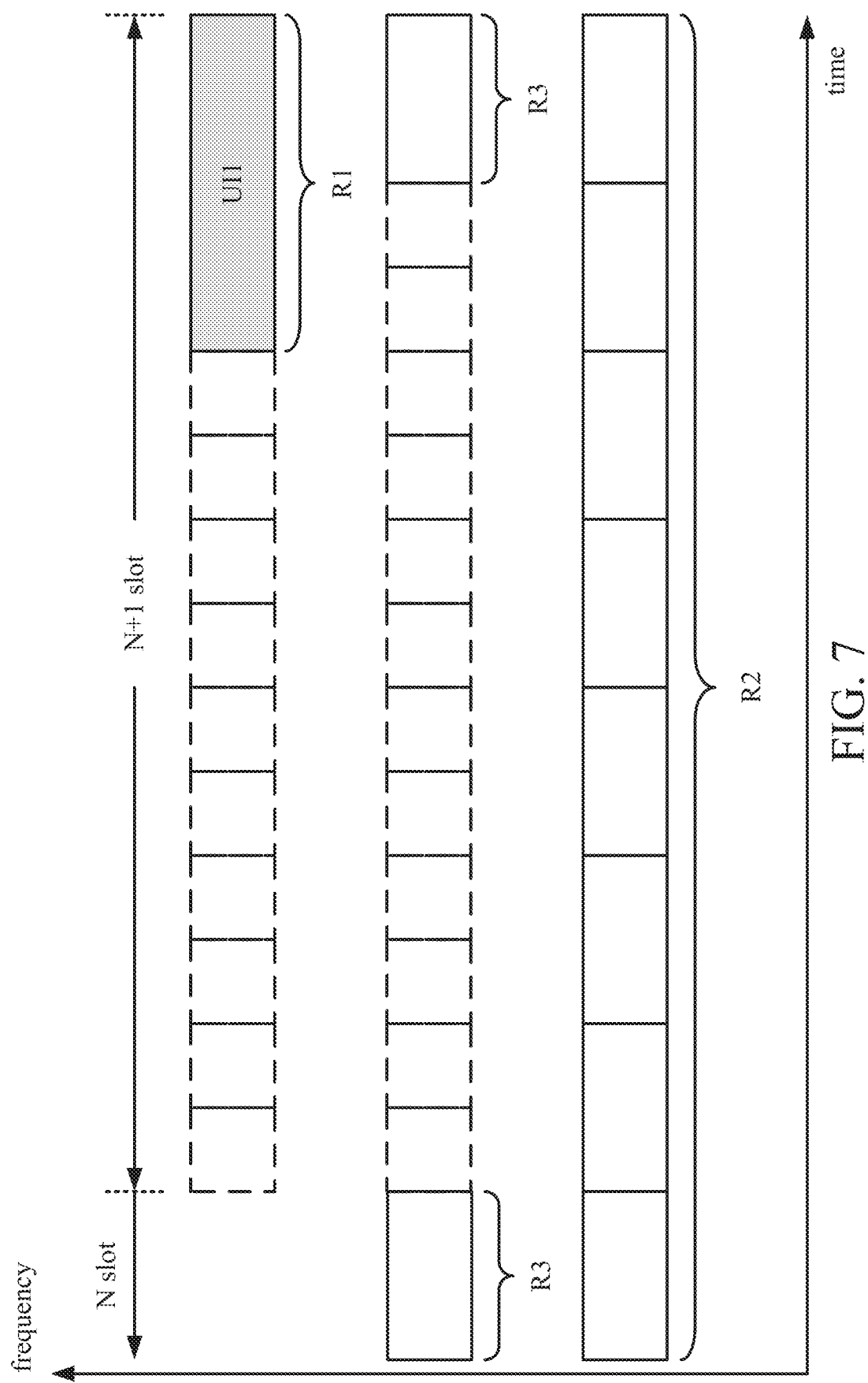
FIG. 7 depicts an implementation scenario of information transmission according to the present invention.

The eighth embodiment is as shown in FIGS. 6A-6B and 7. The eighth embodiment is an extension of the first embodiment. The UE 1 determines that the first PUCCH resource R1, and a third PUCCH resource R3 of the uplink radio resources belong to the first group, and the second PUCCH resource R2 belongs to the second group. For example, both of the first PUCCH resource R1 and the third PUCCH resource R3 are used for transmitting the uplink control information of the eMBB service, and thus are clustered into the same group. While the second PUCCH resource R2 is used for transmitting the uplink control information of the URLLC service, and thus is clustered into the same group. In other words, the first PUCCH resource R1 corresponds to a first logical channel with a second priority, the second PUCCH resource R2 corresponds to a second logical channel with a first priority, and the third PUCCH resource R3 corresponds to the first logical channel with the second priority. The first logical channel corresponds to the eMBB service and the second logical channel corresponds to the URLLC service.

In this embodiment, the UE 1 further determines whether there exists a piece of third uplink information UI3 corresponding to the third PUCCH resource R3. The UE 1 determines whether there exists a triple overlapped period among the first PUCCH resource R1, the second PUCCH resource R2 and the third PUCCH resource R3 in the time domain.

When the triple overlapped period exists, the UE 1 determines that the second uplink information UI2 has the high priority based on the first group belonging to a first service type (e.g., the eMBB service) and the second group belonging to a second service type (e.g., the URLLC service). When the first uplink information UI1 and the third uplink information UI3 are not transmitted yet, the UE 1 stops proceeding to transmit the first uplink information UI1 and the third uplink information UI3, and transmits the second uplink information UI2 on the second PUCCH resource R2, as shown in FIG. 6A.

When the second uplink information UI2 does not exists and the first uplink information UI1 and the third uplink information UI3 exist at the same time, the UE 1 further determines whether there exists another overlapped period in the time domain between the first PUCCH resource R1 and the third PUCCH resource R3. The UE 1 further determines whether the first uplink information UI1 and the third uplink information UI3 can be jointly transmitted when the another overlapped period exists. If the first uplink information UI1 and the third uplink information UI3 can be jointly transmitted, the UE 1 transmits the first uplink information UI1 and the third uplink information UI3 on the first uplink radio resource R1, as shown in FIG. 6B.

For example, it is assumed that the first uplink information UI1 is an HARQ-ACK of the eMBB service, and the first PUCCH resource R1 starts at the $13^{th}$ symbol with format 0 and duration of 2 symbols; the second uplink information UI2 is an SR of the URLLC service, and the second PUCCH resource R2 starts at the $1^{st}$ symbol with format 0, duration of 2 symbols and periodicity of 2 symbols; the third uplink information UI3 is an SR of the eMBB service, and the third PUCCH resource R3 starts at the $13^{th}$ symbol with format 0, duration of 2 symbols and periodicity of 1 slot. When the third uplink information UI3 is triggered to be transmitted at the time point corresponding to the $11^{th}$ symbol, the UE 1 determines that the first uplink information UI1 (i.e., the HARQ-ACK of the eMBB service) and the third uplink information UI3 (i.e., the SR of the eMBB service) can be jointly transmitted on the first PUCCH resource R1, and transmits the first uplink information UI1 and the third uplink information UI3 as shown in FIG. 6B.

On the other hand, if the first uplink information UI1 and the third uplink information UI3 cannot be jointly transmitted, the UE 1 transmits the first uplink information UI1 on the first PUCCH resource R1. For example, please refer to FIG. 7, it is assumed that the first uplink information UI1 is an HARQ-ACK of the eMBB service, the first PUCCH resource R1 starts at the $11^{th}$ symbol with format 1 and duration of 4 symbols; the second uplink information UI2 is an SR of the URLLC service, and the format of the second PUCCH resource R2 is format 0, the second PUCCH resource R2 starts at the $1^{st}$ symbol with format 0, duration of 2 symbols and periodicity of 2 symbols; the third uplink information UI3 is an SR of the eMBB service, and the third PUCCH resource R3 starts at the $13^{th}$ symbol with format 0, duration of 2 symbols and periodicity of 1 slot. When the third uplink information UI3 is triggered to be transmitted at the time point corresponding to the $11^{th}$ symbol, the UE 1 cannot jointly transmit the third uplink information UI3 (i.e., the SR of eMBB service) on the first PUCCH resource R1 since the first uplink information UI1 (i.e., the HARQ-ACK of the eMBB service) now is transmitting on the first PUCCH resource R1.

Figure 8:
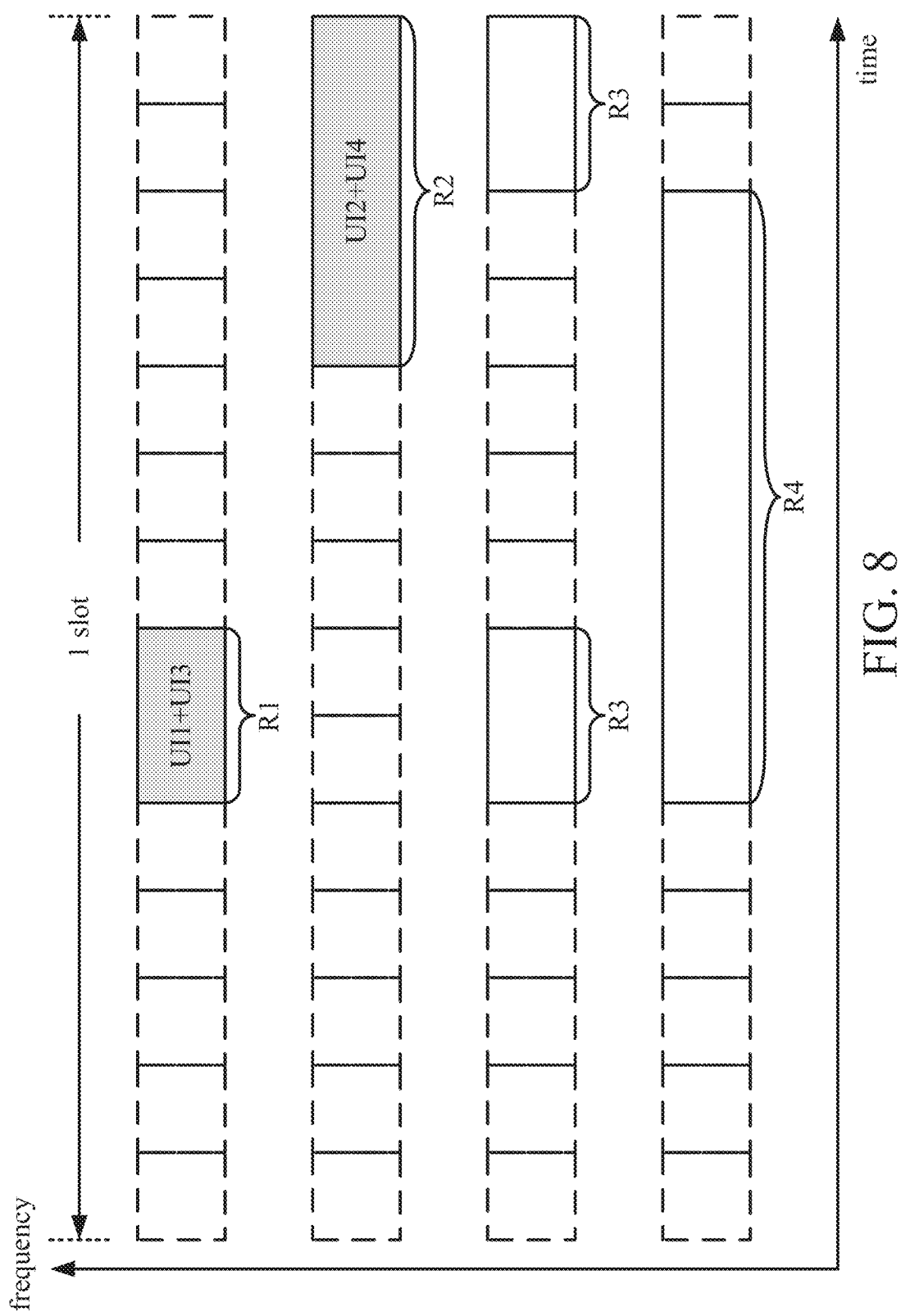
FIG. 8 depicts an implementation scenario of information transmission according to the present invention.
Figure 9:
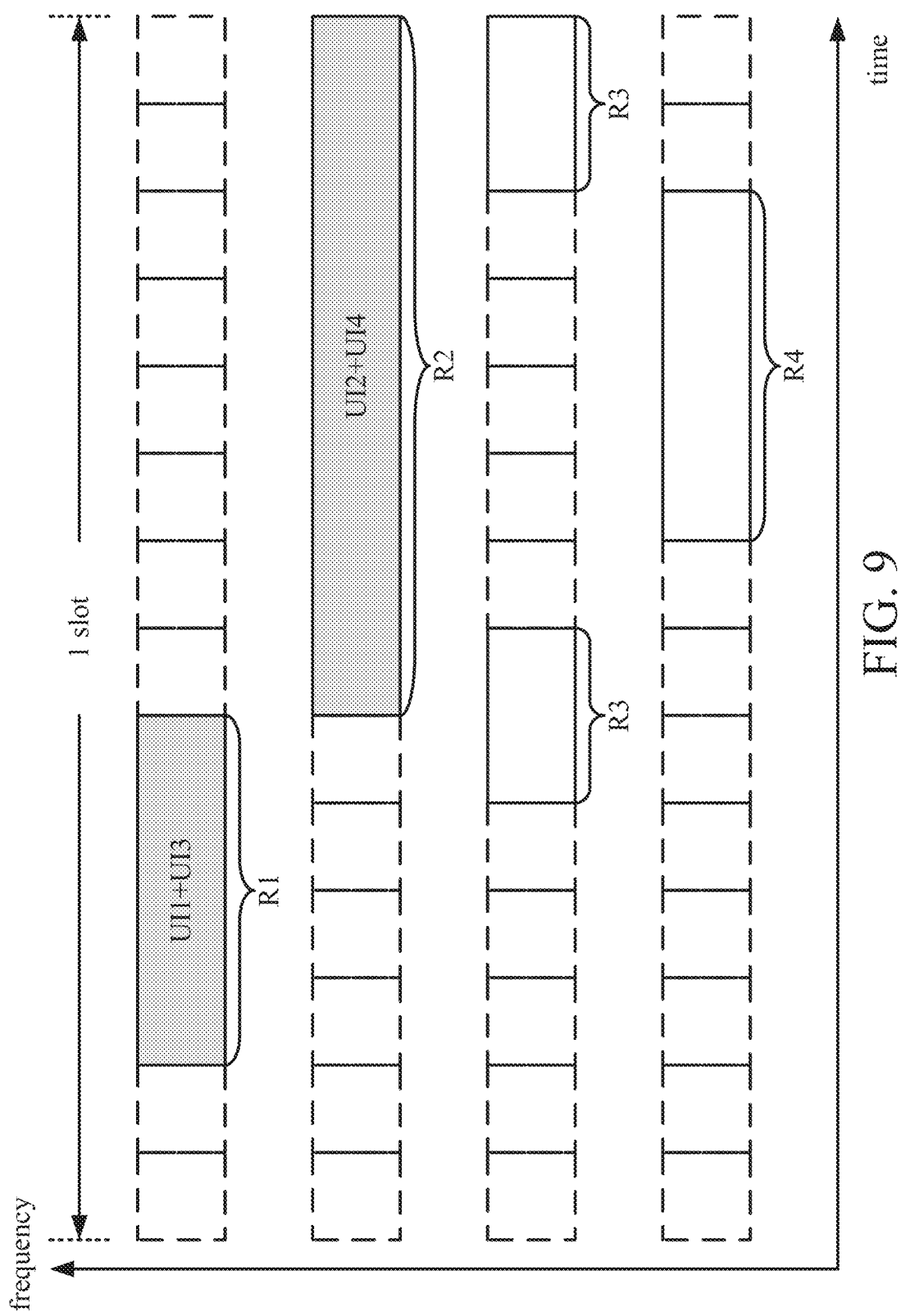
FIG. 9 depicts an implementation scenario of information transmission according to the present invention.

The ninth embodiment is as shown in FIGS. 8-9. The ninth embodiment is an extension of the first embodiment. In this embodiment, the UE 1 further determines that the first PUCCH resource R1 and a third PUCCH resource R3 of the uplink radio resources belong to the first group, and the second PUCCH resource R2 and a fourth PUCCH resource R4 of the uplink radio resources belong to a second group, wherein the first group belongs to a first service type (e.g., the URLLC service) and the second group belongs to a second service type (e.g., the eMBB service). In other words, the first PUCCH resource R1 corresponds to a first logical channel with a first priority, the second PUCCH resource R2 corresponds to a second logical channel with a second priority, the third PUCCH resource R3 corresponds to the first logical channel with the first priority, and the fourth PUCCH R4 resource corresponds to the second logical channel with the second priority. The first logical channel corresponds to the URLLC service, and the second logical channel corresponds to the eMBB service.

In this embodiment, the UE 1 further determines whether there exists a piece of third uplink information UI3 corresponding to the third PUCCH resource R3, and determines whether there exists a piece of fourth uplink information UI4 corresponding to the fourth PUCCH resource R4. When the first uplink information UI1, the second uplink information UI2, the third uplink information UI3 and the fourth uplink information UI4 exist at the same time, the UE 1 determines whether there exists the overlapped period between the first PUCCH resource R1 and the second PUCCH resource R2 in the time domain, whether there exists a first overlapped period between the first PUCCH resource R1 and the third PUCCH resource R3 in the time domain, and whether there exists a second overlapped period between the second PUCCH resource R2 and the fourth PUCCH resource R4 in the time domain.

When the overlapped period does not exist and the first overlapped period and the second overlapped period exist, the UE 1 transmits the first uplink information UI1 and the third uplink information UI3 on the first PUCCH resource R1 and transmits the second uplink information UI2 and the fourth uplink information UI4 on the second PUCCH resource R2. For example, as shown in FIG. 8, it is assumed that the first uplink information UI1 is an HARQ-ACK of the URLLC service and the first PUCCH resource R1 starts at the $6^{th}$ symbol with format 0 and duration of 2 symbols; the second uplink information UI2 is an HARQ-ACK of the eMBB service and the second PUCCH resource R2 starts at the 11 symbol with format 4 and duration of 4 symbols; the third uplink information UI3 is an SR of the URLLC service and the third PUCCH resource R3 starts at the $6^{th}$ symbol with format 0, duration of 2 symbols and periodicity of 7 symbols; and the fourth uplink information UI4 is an SR of the eMBB service, and the fourth PUCCH resource R4 starts at the $6^{th}$ symbol with format 1, duration of 7 symbols and periodicity of 1 slot.

When the third uplink information UI3 and the fourth uplink information UI4 are triggered to be transmitted at the time point corresponding to the $5^{th}$ symbol, the UE 1 transmits the first uplink information UI1 (i.e., the HARQ-ACK of the URLLC service) and the third uplink information UI3 (i.e., the SR of URLLC service) on the first PUCCH resource R1, and transmits the second uplink information UI2 (i.e., the HARQ-ACK of the eMBB service) and the fourth uplink information UI4 (i.e., the SR of the eMBB service) on the second PUCCH resource R2. It shall be noted that, in practice, the SR can be represented by 1 bit (but not limited thereto) to be encoded with the HARQ-ACK, and transmitted on the PUCCH resource which the HARQ-ACK corresponds to. After receiving the signal on the PUCCH resource which the HARQ-ACK corresponds to, the BS 2 assumes that 1 bit in the decoded signal represents the SR so as to be informed whether an SR exists.

In another example, as shown in FIG. 9, it is assumed that the first uplink information UI1 is an HARQ-ACK of the URLLC service and the first PUCCH resource R1 starts the $3^{rd}$ symbol with format 4 and duration of 4 symbols; the second uplink information UI2 is an HARQ-ACK of the eMBB service and the second PUCCH resource R2 starts at the $7^{th}$ symbol with format 4, duration of 8 symbols; the third uplink information UI3 is an SR of the URLLC service and the third PUCCH resource R3 starts at $6^{th}$ symbol with format 0, duration of 2 symbols and periodicity of 7 symbols; the fourth uplink information UI4 is an SR of the eMBB service and the fourth PUCCH resource R4 starts at the $9^{th}$ symbol with format 1, duration of 4 symbols and periodicity of 1 slot.

When the third uplink information UI3 and the fourth uplink information UI4 are triggered to be transmitted at the time point corresponding to the $2^{nd}$ symbol, the UE 1 transmits the first uplink information UI1 (i.e., the HARQ-ACK of the URLLC service) and the third uplink information UI3 (i.e., the SR of the URLLC service) on the first PUCCH resource R1, and transmits the second uplink information UI2 (i.e., the HARQ-ACK of the eMBB service) and the fourth uplink information UI4 (i.e., the SR of the eMBB service) on the second PUCCH resource R2.

Figure 10:
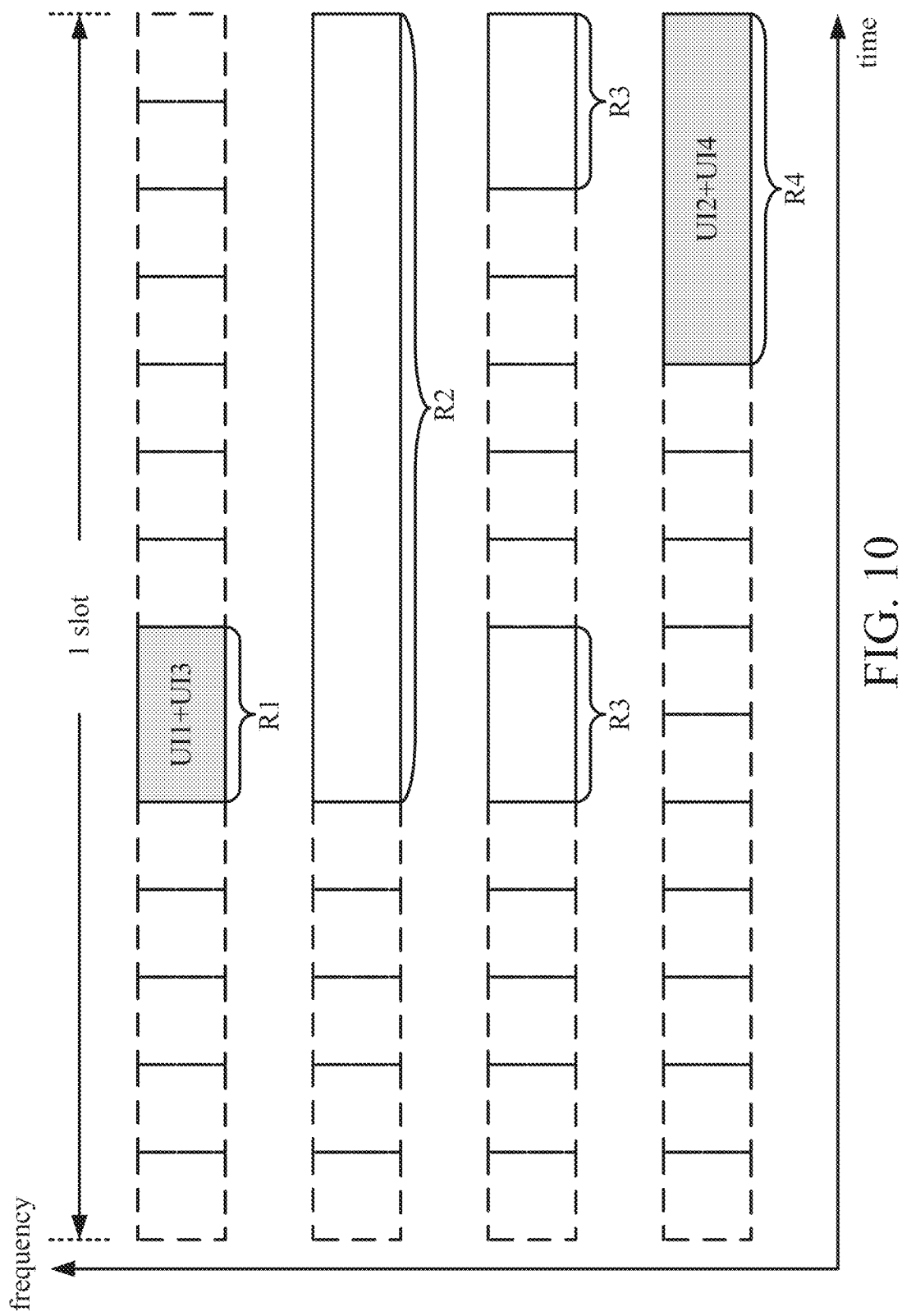
FIG. 10 depicts an implementation scenario of information transmission according to the present invention.
Figure 11:
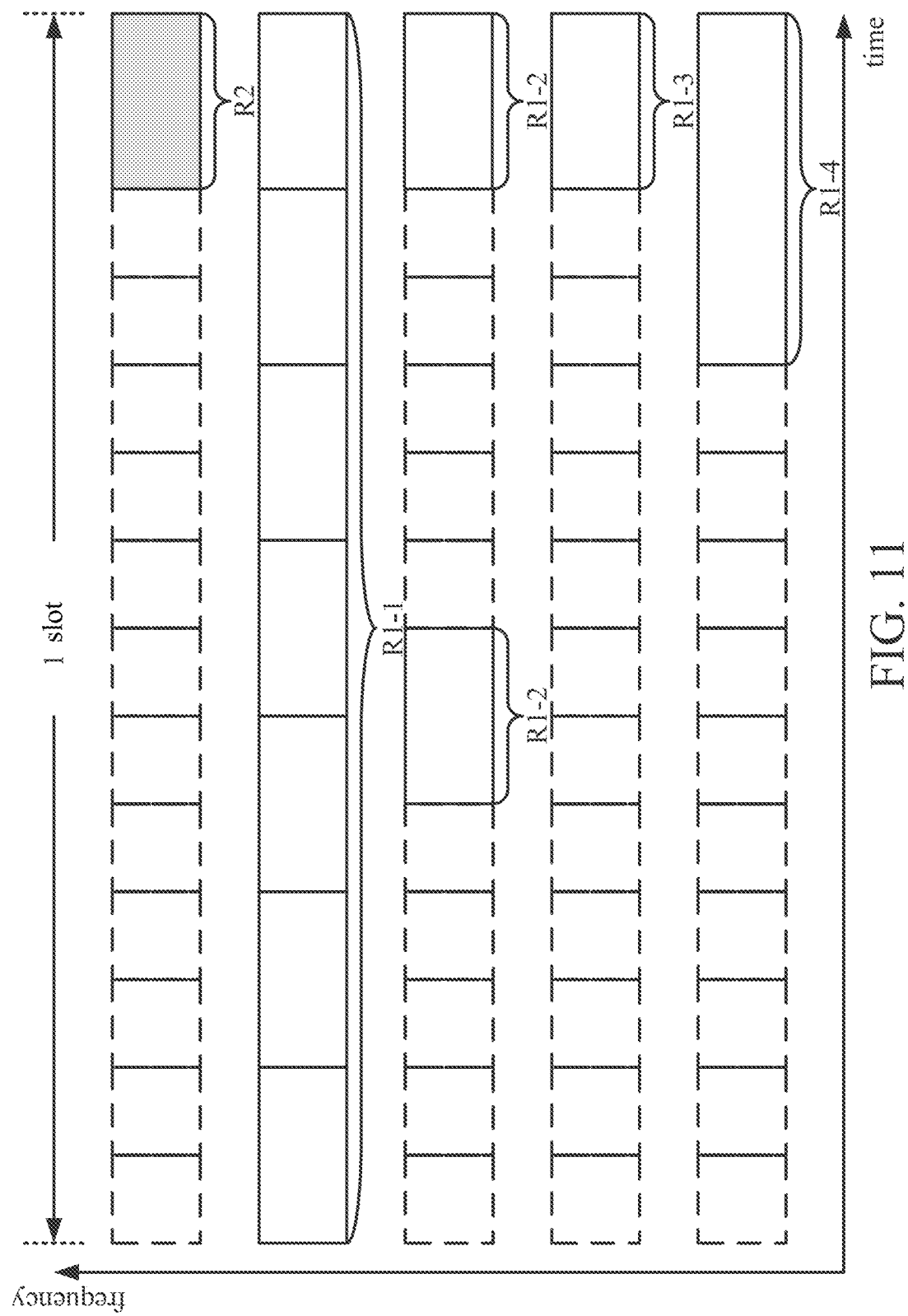

The tenth embodiment is as shown in FIG. 10. The tenth embodiment is an extension of the first embodiment. Different from the ninth embodiment, when the first uplink information UI1, the second uplink information UI2, the third uplink information UI3 and the fourth uplink information UI4 exist at the same time, the UE 1 determines whether there exists the overlapped period between the first PUCCH resource R1 and the second PUCCH resource R2 in the time domain, whether there exists the first overlapped period between the first PUCCH resource R1 the third PUCCH resource R3 in the time domain, whether there exists the second overlapped period between the second PUCCH resource R2 and the fourth PUCCH resource R4 in the time domain, and whether there exists a third overlapped period between the first PUCCH resource R1 and the fourth PUCCH resource R4 in the time domain.

When the overlapped period, the first overlapped period and the second overlapped period exist and the third overlapped period does not exist, the UE 1 transmits the first uplink information UI1 and the third uplink information UI3 on the first PUCCH resource R1 and transmits the second uplink information UI2 and the fourth uplink information UI4 on the fourth PUCCH resource R4. For example, as shown in FIG. 10, it is assumed that the first uplink information UI1 is an HARQ-ACK of the URLLC service and the first PUCCH resource R1 starts at the $6^{th}$ symbol with format 0 and duration of 2 symbols; the second uplink information UI2 is an HARQ-ACK of the eMBB service and the second PUCCH resource R2 starts at the $5^{th}$ symbol with format 1 and duration of 10 symbols; the third uplink information UI3 is an SR of the URLLC service and the third PUCCH resource R3 starts at the $6^{th}$ symbol with format 0, duration of 2 symbols and periodicity of 7 symbols; the fourth uplink information UI4 is an SR of the eMBB service and the fourth PUCCH resource R4 starts at $11^{th}$ symbol with format 1, duration of 4 symbols and periodicity of 1 slot.

Accordingly, if the third uplink information UI3 and the fourth uplink information UI4 are triggered to be transmitted at the time point before the $5^{th}$ symbol, the UE 1 can jointly transmit the first uplink information UI1 (i.e., the HARQ-ACK of the URLLC service) and the third uplink information UI3 (i.e., the SR of the URLLC service) on the first PUCCH resource R1, and can jointly transmit the second uplink information UI2 (i.e., the HARQ-ACK of the eMBB service) and the fourth uplink information UI4 (i.e., the SR of the eMBB service on the fourth PUCCH resource R4.)

It shall be appreciated that, according to the restriction on the amount of information carried by each PUCCH format, in this embodiment, the SR of the URLLC service is represented by 1 bit to be encoded with the HARQ-ACK of the URLLC service and transmitted on the PUCCH resource which the HARQ-ACK corresponds to, and the HARQ-ACK of eMBB service and the SR of the eMBB service are encoded together and jointly transmitted on the PUCCH resource which the SR corresponds to.

Figure 11:
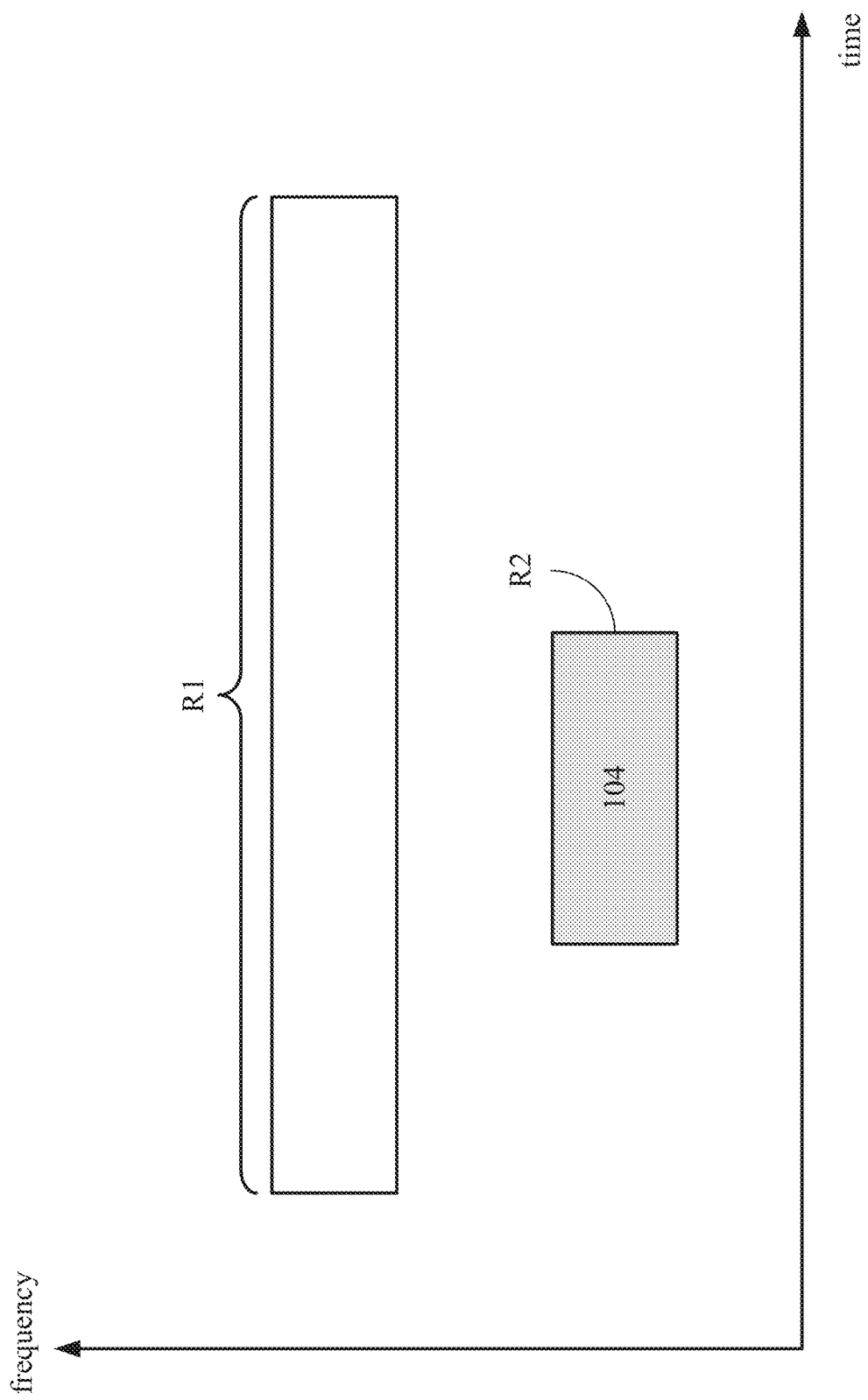
FIG. 11 depicts an implementation scenario of information transmission according to the present invention.

The eleventh embodiment of the present invention is as shown in FIG. 11. Different from the first embodiment, in this embodiment, the UE 1 divides the PUCCH resources corresponding to a specific information type into different groups, generates a piece of group information according to whether the uplink control information corresponding to the specific information type in each of the groups is triggered to be transmitted, and transmits the group information with other uplink control information.

Specifically, the UE 1 divides a plurality of first PUCCH resources, which belong to a first information type (e.g., the SR), of the uplink radio resources into at least one group, and determines whether there exists at least one piece of first uplink information corresponding to at least one of the first uplink radio resources and whether there exists a piece of second uplink information corresponding to a second uplink radio resource of the uplink radio resources.

When the at least one piece of first uplink information and the second uplink information exist at the same time, the UE 1 further determines whether an overlapped period exists between the at least one of the first PUCCH resources, to which the at least one piece of first uplink information corresponds, and the second PUCCH resource on a time domain. When the overlapped period exists, the UE 1 generates a piece of group information according to the at least one group and transmits the second uplink information and the information group on the second PUCCH resource.

For example, the pieces of the uplink information UI1, which the first PUCCH resources correspond to, are a plurality of SRs and include two kinds of SRs of the URLLC service and two kinds of SRs of the eMBB service. The two kinds of SRs of the URLLC service correspond to the first PUCCH resource R1-1 (the format is format 0 and starts at the $1^{st}$ symbol with duration of 2 symbols and periodicity of 2 symbols) and the first PUCCH resource R1-2 (the format is format 0 and starts at the $6^{th}$ symbol with duration of 2 symbols and periodicity of 7 symbols) respectively. The two kinds of SRs of the eMBB service correspond to the first PUCCH resource R1-3 (the format is format 0 and starts at the $13^{th}$ symbol with duration of two symbols and periodicity of 1 slot) and the first PUCCH resource R1-4 (the format is format 1 and starts at the $11^{th}$ symbol with duration of 4 symbols and periodicity of 2 slots) respectively. The second uplink information UI2 is an HARQ-ACK of the URLLC service and corresponds to the second PUCCH resource R2 (starting at the $13^{th}$ symbol with format 2 and duration of 2 symbols).

It is assumed that the second PUCCH resource R2 for carrying the HARQ-ACK of the URLLC service has a second priority, the first PUCCH resource R1-1 for carrying the SR of the URLLC service has a first priority, the first PUCCH resource R1-2 for carrying the SR of URLLC service has the second priority, the first PUCCH resource R1-3 for carrying the SR of the eMBB service has a third priority, and the first PUCCH resource R1-4 for carrying the SR of the eMBB service has a fourth priority. Based a priority comparison between the first PUCCH resources and the second PUCCH resource, the UE 1 puts the first PUCCH resource R1-1 into the first group (because the priority of the first PUCCH resource R1-1 is higher than the second PUCCH resource R2), puts the first PUCCH resource R1-2 into the second group (because the priority of the first PUCCH resource R1-2 is the same as the second PUCCH resource R2), and puts the first PUCCH resources R1-3, R1-4 into the third group (because the priority of the first PUCCH resources R1-3, R1-4 are lower than the second PUCCH resource R2)

Afterwards, the UE 1 represents the SR in each group by multiple bits (e.g., 3 bits), according to whether there exists the piece(s) of uplink information which corresponds to the first PUCCH resource(s) of each group, to generate group information. For example, when there exits the pieces of uplink information which correspond to the first PUCCH resources of the first group and the third group, the UE 1 uses 3 bits for representation (e.g., 101), where the first bit represents the first group, the second bit represents the second group, and the third bit represents the third group.

When there exists the overlapped period between the first PUCCH resources and the second PUCCH resource, the UE 1 generates the group information (e.g., 101) and transmits the HARQ-ACK of the URLLC service and the group information on the second PUCCH resource.

Figure 12:
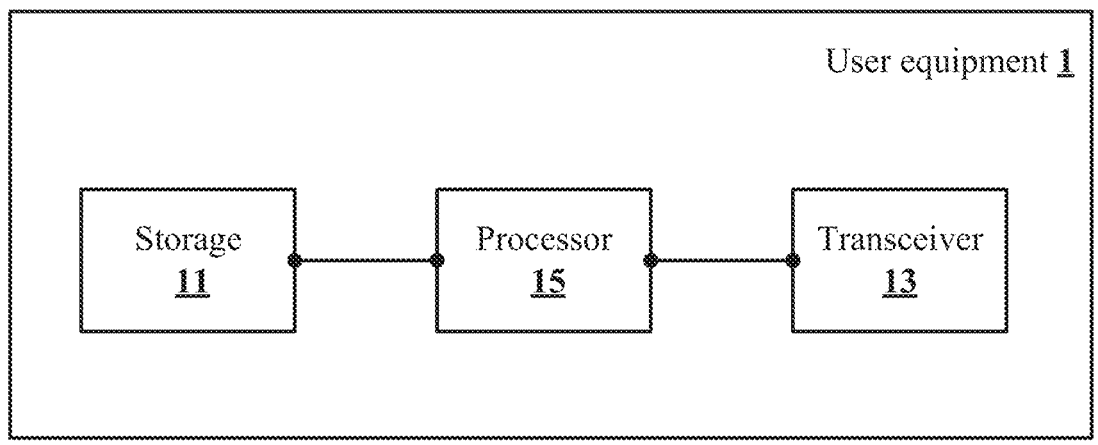
FIG. 12 is a schematic view of the UE 1 according to the present invention.

The twelfth embodiment of the present invention is as shown in FIG. 12, which is a schematic view of the UE 1 according to the present invention. The UE 1 comprises a storage 11, a transceiver 13 and a processor 15. The processor 15 is electrically connected to the storage 11 and the transceiver 13. As described in the first embodiment, the BS 2 configures and schedules a plurality of uplink radio resources for the UE 1. When the processor 15 determines that there are uplink radio resources, the processor 15 divides the uplink radio resources into at least one group. After dividing them in to the groups, the processor 15 further determines whether there exists a piece of first uplink information corresponding to a first uplink radio resource of the uplink radio resources and determines whether there exists a piece of second uplink information corresponding to a second uplink radio resource of the uplink radio resources.

The processor 15 determines whether an overlapped period exists in a time domain between the first uplink radio resource and the second uplink radio resource when the first uplink information and the second uplink information exist at the same time. Besides, the processor 15 determines whether the first uplink radio resource and the second uplink radio resource belong to a first group of the at least one group when the overlapped period exists.

The processor 15 determines whether the first uplink information and the second uplink information can be jointly transmitted when the first uplink radio resource and the second uplink radio resource belong to the first group. The processor 15 transmits, via the transceiver 13, the first uplink information and the second uplink information on one of the first uplink radio resource and the second uplink radio resource when the first uplink information and the second uplink information can be jointly transmitted. The processor 15 transmits, via the transceiver 13, one of the first uplink information and the second uplink information on one of the first uplink radio resource and the second uplink radio resource based on a priority decision when the first uplink information and the second uplink information cannot be jointly transmitted or when only one of the first uplink information and the second uplink information belongs to the first group.

In other embodiment, each of the uplink radio resources corresponding to a logical channel, and the processor 15 divides the uplink radio resources into the at least one group according to the logical channels.

In other embodiment, when the overlapped period exists and the first uplink information is transmitting on the first uplink radio resource, the processor 15 further determines whether the second uplink information has a high priority. The processor 15 interrupts the transmission of the first uplink information on the first uplink radio resource and transmits the second uplink information on the second uplink radio resource during the overlapped period when the second uplink information has the high priority.

In an embodiment corresponding to the second embodiment, the first uplink radio resource is located in a plurality of first slots, the second uplink radio resource is located in a plurality of second slots, and the first slots are partially overlapped with the second slots.

In other embodiment, the priority decision is made according to at least one of an information type, the logical channel which each of the uplink radio resources corresponds to, a resource periodicity and a resource overlapping condition.

In an embodiment corresponding to the third embodiment, in response to the second uplink information being triggered to be transmitted at a trigger time point, the processor 15 further determines whether the first uplink radio resource overlaps at least two the second uplink radio resources in the time domain after the trigger time point. When the overlapped period exists and the first uplink radio resource overlaps at least two the second uplink radio resources in the time domain, the processor 15 further determines that the second uplink information has the high priority. In addition, the processor 15 determines that the first uplink information has the high priority when the first uplink radio resource overlaps only one the second uplink radio resource in the time domain and the first uplink information is transmitting on the first uplink radio resource.

In an embodiment corresponding to the fourth embodiment, in response to the second uplink information being triggered to be transmitted at a trigger time point, the processor 15 determines whether the first uplink radio resource overlaps at least two the second uplink radio resources in the time domain after the trigger time point. When the overlapped period exists, the processor 15 further executes the following operations: determining that the second uplink information has the high priority when the first uplink radio resource overlaps at least two the second uplink radio resources in the time domain and the first uplink information and the second uplink information are not transmitted; and determining that the first uplink information has the high priority to transmit the first uplink information on the first uplink radio resource when the first uplink radio resource overlaps only one the second uplink radio resource in the time domain and the first uplink radio resources is earlier than the second uplink radio resource in the time domain.

In an embodiment corresponding to the fifth embodiment, in response to the second uplink information being triggered to be transmitted at a trigger time point, the processor 15 determines that the second uplink radio resource is a periodic radio resource and corresponds to a first logical channel with a first priority, and determines that the first uplink radio resource is a scheduled uplink radio resource and corresponds to a second logical channel with a second priority. When the overlapped period exists, the processor 15 further determines that the second uplink information has the high priority.

In an embodiment corresponding to the sixth embodiment, in response to the second uplink information being triggered to be transmitted at a trigger time point, the processor 15 determines that the first uplink radio resource is a periodic radio resource and corresponds to a first logical channel with a first priority, and determines that the second uplink radio resource is a scheduled uplink radio resource and corresponds to the first logical channel with the first priority. When the overlapped period exists, the processor 15 further determines that the second uplink information has the high priority.

In an embodiment corresponding to the seventh embodiment, the first uplink radio resource is a first scheduled uplink radio resource on a physical uplink control channel (PUCCH), and the second uplink radio resource is a second scheduled uplink radio resource on the PUCCH. The first scheduled uplink radio resource is scheduled by the BS 2 earlier than the second scheduled uplink radio resource. When the overlapped period exists, the processor 15 further determines that the second uplink information has a high priority based on the first uplink information belongs to a first service type and the second uplink information belongs to a second service type. The processor 15 interrupts the transmission of the first uplink information on the first uplink radio resource when the first uplink information is transmitting on the first uplink radio resource, and transmits the second uplink information on the second uplink radio resource. Besides, the processor 15 stops proceeding to transmit the first uplink information when the first uplink information is not transmitted yet, and transmits the second uplink information on the second uplink radio resource In an embodiment, the first uplink radio resource corresponds to a first logical channel with a lower priority, and the second uplink radio resource corresponds to a second logical channel with a higher priority. The first logical channel corresponds to the eMBB service and the first uplink radio resource has the No. 4 PUCCH format (i.e., format 4), and the second logical channel corresponds to the URLLC service and the second uplink radio resource had the No. 0 PUCCH format (i.e., format 0).

In an embodiment corresponding to the eighth embodiment, the processor 15 determines that the first uplink radio resource and a third uplink radio resource of the uplink radio resources belong to the first group, and the second uplink radio resource belongs to a second group. Next, the processor 15 determines whether there exists a piece of third uplink information corresponding to the third uplink radio resource. The processor 15 determines whether there exists a triple overlapped period among the first uplink radio resource, the second uplink radio resource and the third uplink radio resource in the time domain when the first uplink information, the second uplink information and the third uplink information exist at the same time.

When the triple overlapped period exists, the processor 15 further executes the following operations: determining that the second uplink information has a high priority based on the first group belongs to a first service type and the second group belongs to a second service type; and stopping proceeding to transmit the first uplink information and the third uplink information when the first uplink information and the third uplink information are not transmitted yet, and transmitting the second uplink information on the second uplink radio resource.

In addition, when the second uplink information does not exist and the first uplink information and the third uplink information exist at the same time, the processor 15 further executes the following operations: determining whether there exists another overlapped period in the time domain between the first uplink radio resource and the third uplink radio resource; determining whether the first uplink information and the third uplink information can be jointly transmitted when the another overlapped period exists; transmitting the first uplink information and the third uplink information on the first uplink radio resource when the first uplink information and the third uplink information can be jointly transmitted; and transmitting the first uplink information on the first uplink radio resource when the first uplink information and the third uplink information cannot be jointly transmitted.

In an embodiment, the first uplink radio resource corresponds to a first logical channel with a second priority, the second uplink radio resource corresponds to a second logical channel with a first priority, and the third uplink radio resource corresponds to the first logical channel with the second priority. The first logical channel corresponds to the eMBB service, the second logical channel corresponds to the URLLC service. The first uplink radio resource has the No. 0 PUCCH format (i.e., format 0), the second uplink radio resource has the No. 0 PUCCH format (i.e., format 0), and the third uplink radio resource has the No. PUCCH format (i.e., format 0).

In an embodiment corresponding to the ninth embodiment, the processor 15 determines that the first uplink radio resource and a third uplink radio resource of the uplink radio resources belong to the first group, and the second uplink radio resource and a fourth uplink radio resource of the uplink radio resources belong to a second group. The first group belongs to a first service type and the second group belongs to a second service type.

Next, the processor 15 determines whether there exists a piece of third uplink information corresponding to the third uplink radio resource, and determines whether there exists a piece of fourth uplink information corresponding to the fourth uplink radio resource. When the first uplink information, the second uplink information, the third uplink information and the fourth uplink information exist at the same time, the processor 15 determines whether there exists the overlapped period between the first uplink radio resource and the second uplink radio resource in the time domain, whether there exists a first overlapped period between the first uplink radio resource the third uplink radio resource in the time domain, and whether there exists a second overlapped period between the second uplink radio resource and the fourth uplink radio resource in the time domain. The processor 15 transmits the first uplink information and the third uplink information on the first uplink radio resource and transmits the second uplink information and the fourth uplink information on the second uplink radio resource when the overlapped period does not exist and the first overlapped period and the second overlapped period exist.

In an embodiment, the first uplink radio resource corresponds to a first logical channel with a first priority, the second uplink radio resource corresponds to a second logical channel with a second priority, the third uplink radio resource corresponds to the first logical channel with the first priority, and the fourth uplink radio resource corresponds to the second logical channel with the second priority. The first logical channel corresponds to the URLLC service and the second logical channel corresponds to the eMBB service. The first uplink radio resource has one of the No. 0 PUCCH format (i.e., format 0) and the No. 4 PUCCH format (i.e., format 4), the second uplink radio resource has the NO. 4 PUCCH format (i.e., format 4), the third uplink radio resource has the NO. 0 PUCCH format (i.e., format 0), and the fourth uplink radio resource has the No. 0 PUCCH format (i.e., format 0).

In an embodiment corresponding to the tenth embodiment, the processor 15 determines that the first uplink radio resource and a third uplink radio resource of the uplink radio resources belong to the first group, and the second uplink radio resource and a fourth uplink radio resource of the uplink radio resources belong to a second group. The first group belongs to a first service type and the second group belongs to a second service type.

Next, the processor 15 determines whether there exists a piece of third uplink information corresponding to the third uplink radio resource and determines whether there exists a piece of fourth uplink information corresponding to the fourth uplink radio resource. When the first uplink information, the second uplink information, the third uplink information and the fourth uplink information exist at the same time, the processor 15 determines whether there exists the overlapped period between the first uplink radio resource and the second uplink radio resource in the time domain, whether there exists a first overlapped period between the first uplink radio resource and the third uplink radio resource in the time domain, whether there exists a second overlapped period between the second uplink radio resource and the fourth uplink radio resource in the time domain, and whether there exists a third overlapped period between the first uplink radio resource and the fourth uplink radio resource in the time domain. The processor 15 transmits the first uplink information and the third uplink information on the first uplink radio resource and transmits the second uplink information and the fourth uplink information on the fourth uplink radio resource when the overlapped period, the first overlapped period and the second overlapped period exist and the third overlapped period does not exist.

In an embodiment, the first uplink radio resource corresponds to a first logical channel with a first priority, the second uplink radio resource corresponds to a second logical channel with a second priority, the third uplink radio resource corresponds to the first logical channel with the first priority, and the fourth uplink radio resource corresponds to the second logical channel with the second priority. The first logical channel corresponds to the URLLC service and the second logical channel corresponds to the eMBB service. The first uplink radio resource has the No. 0 PUCCH format (i.e., format 0), the second uplink radio resource has the No. 1 PUCCH format (i.e., format 1), the third uplink radio resource has the No. 0 PUCCH format (i.e., format 0), and the fourth uplink radio resource has the No. 4 PUCCH format (i.e., format 4).

Please also refer to FIG. 12 for the thirteenth embodiment. This embodiment corresponds to the eleventh embodiment. The processor 15 determines that there are a plurality of uplink radio resources and divides a plurality of first uplink radio resources, which belong to a first information type, of the uplink radio resources into at least one group. Afterwards, the processor 15 determines whether there exists at least one piece of first uplink information which corresponds to at least one of the first uplink radio resources and determines whether there exists a piece of second uplink information which corresponds to a second uplink radio resource of the uplink radio resources.

When the at least one piece of first uplink information and the second uplink information exist at the same time, the processor 15 determines whether an overlapped period exists between the at least one of the first uplink radio resources, to which the at least one piece of first uplink information corresponds, and the second uplink radio resource on a time domain. The processor 15 generates a piece of group information according to the at least one group when the overlapped period exists. Next, the processor 15 transmits, via the transceiver 13, the second uplink information and the group information on the second uplink radio resource.

In an embodiment, the first uplink radio resource corresponds to a scheduling request information type and the second uplink radio resource corresponds to a hybrid automatic repeat request acknowledgement (HARQ-ACK) information type.

Figure 13:
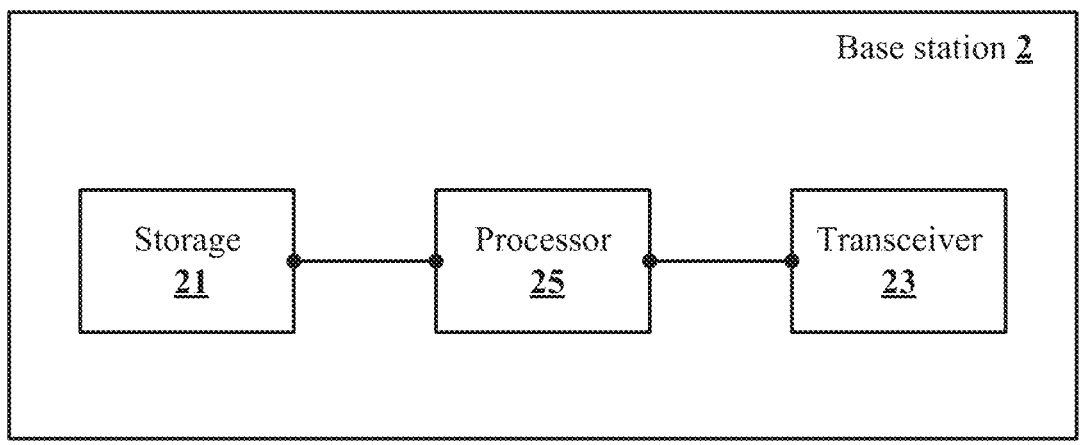
FIG. 13 is a schematic view of the BS 2 according to the present invention.

The fourteenth embodiment is as shown in FIG. 13, which is a schematic view of the BS 2 according to the present invention. The BS 2 comprises a storage 21, a transceiver 23 and a processor 25. The processor 25 is electrically connected to the storage 21 and the transceiver 23.

As described in the first embodiment, the BS 2 configures and schedules a plurality of uplink radio resources for the UE 1. The processor 25 determines that there are a plurality of uplink radio resources and divides the uplink radio resources into at least one group. Next, the processor 25 determines that there exists an overlapped period between a first uplink radio resource (e.g., the PUCCH resource R1) and a second uplink radio resource (e.g., the PUCCH resource R2) of the uplink radio resources in a time domain and determines whether the first uplink radio resource and the second uplink radio resource belong to a same group of the at least one group.

The processor 25 determines whether a piece of first uplink information corresponds to the first uplink radio resource and a piece of second uplink information corresponds to the second uplink radio resource can be jointly transmitted on one of the first uplink radio resource and the second uplink radio resource. Next, the processor 25 determines whether a first uplink signal on the first uplink radio resource is received via the transceiver 23 and determines whether a second uplink signal on the second uplink radio resource is received via the transceiver 23. When only receiving the first uplink signal on the first uplink radio resource and the first uplink information and the second uplink information can be jointly transmitted on the first uplink radio resource, the processor 25 decodes the first uplink signal to obtain the first uplink information or obtain the first uplink information and the second uplink information at the same time. When only receiving the second uplink signal on the second uplink radio resource and the first uplink information and the second uplink information can be jointly transmitted on the second uplink radio resource, the processor 25 decodes the second uplink signal to obtain the first uplink information or obtain the first uplink information and the second uplink information at the same time. The processor 25 decodes the second uplink signal to obtain the second uplink information if the first uplink radio resource and the second uplink radio resource do not belong to the same group when receiving the first uplink signal on the first uplink radio resource and receiving the second uplink signal on the second uplink radio resource, wherein only the second uplink radio resource has the second uplink signal during the overlapped period.

In an embodiment, the processor 25 further decodes the first uplink signal to obtain the first uplink information if the first uplink signal exists on the first uplink radio resource except during the overlapped period when receiving the first uplink signal on the first uplink radio resource and receiving the second uplink signal on the second uplink radio resource. In addition to the aforesaid operations, the processor 25 of the BS 2 can also execute all the operations described in all the aforesaid embodiments. How this embodiment executes these operations will be readily appreciated by those of ordinary skill in the art based on the explanation of all the aforesaid embodiments, and thus will not be further described herein.

According to the above descriptions, the UE of the present invention can divide the uplink radio resources into different groups and decide how to transmit the uplink information according to the resource overlap situation in the group and the priorities of the pieces of the uplink information when the multiple uplink radio resources, which multiple pieces of uplink information correspond to, are overlapped in time domain. Accordingly, under the condition that the uplink control information with the higher priority is transmitted first, the present invention can reduce the possibility of dropping the uplink control information with the lower priority and make sure that the uplink control information with the higher priority can be transmitted to meet the requirement of URLLC service.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment (UE) for a mobile communication system, comprising:
   a storage;
   a transceiver; and
   a processor electrically connected to the storage and the transceiver, being configured to execute the operations, comprising:
      determining that there are a plurality of uplink radio resources and dividing the uplink radio resources into at least one group;
      determining whether there exists a piece of first uplink information corresponding to a first uplink radio resource of the uplink radio resources;
      determining whether there exists a piece of second uplink information corresponding to a second uplink radio resource of the uplink radio resources;
      determining whether an overlapped period exists in a time domain between the first uplink radio resource and the second uplink radio resource when the first uplink information and the second uplink information exist at the same time;
      determining whether the first uplink radio resource and the second uplink radio resource belong to a first group of the at least one group when the overlapped period exists;
      determining whether the first uplink information and the second uplink information can be jointly transmitted;
      transmitting, via the transceiver, the first uplink information and the second uplink information on one of the first uplink radio resource and the second uplink radio resource when the first uplink information and the second uplink information can be jointly transmitted; and
      transmitting, via the transceiver, one of the first uplink information and the second uplink information on one of the first uplink radio resource and the second uplink radio resource based on a priority decision when the first uplink information and the second uplink information cannot be jointly transmitted or when only one of the first uplink information and the second uplink information belongs to the first group.

2. The user equipment of claim 1, wherein each of the uplink radio resources corresponding to a logical channel, and the processor divides the uplink radio resources into the at least one group according to the logical channels.

3. The user equipment of claim 1, wherein when the overlapped period exists, the processor further executes the operations, comprising:
  determining whether the second uplink information has a high priority when the first uplink information is transmitting on the first uplink radio resource; and
  interrupting the transmission of the first uplink information on the first uplink radio resource and transmitting the second uplink information on the second uplink radio resource during the overlapped period when the second uplink information has the high priority.

4. The user equipment of claim 3, wherein the first uplink radio resource is located in a plurality of first slots, the second uplink radio resource is located in a plurality of second slots, and the first slots are partially overlapped with the second slots.

5. The user equipment of claim 3, wherein each of the uplink radio resources corresponding to a logical channel, and the priority decision is made according to at least one of an information type, the logical channel which each of the uplink radio resources corresponds to, a resource periodicity and a resource overlapping condition.

6. The user equipment of claim 5, wherein in response to the second uplink information being triggered to be transmitted at a trigger time point, the processor further determines whether the first uplink radio resource overlaps at least two the second uplink radio resources in the time domain after the trigger time point, and when the overlapped period exists, the processor further executes the operations, comprising:
  determining that the second uplink information has the high priority when the first uplink radio resource overlaps at least two the second uplink radio resources in the time domain; and
  determining that the first uplink information has the high priority when the first uplink radio resource overlaps only one the second uplink radio resource in the time domain and the first uplink information is transmitting on the first uplink radio resource.

7. The user equipment of claim 5, wherein in response to the second uplink information being triggered to be transmitted at a trigger time point, the processor determines that the second uplink radio resource is a periodic radio resource and corresponds to a first logical channel with a first priority, and determines that the first uplink radio resource is a scheduled uplink radio resource and corresponds to a second logical channel with a second priority, and when the overlapped period exists, the processor further determines that the second uplink information has the high priority.

8. The user equipment of claim 5, wherein in response to the second uplink information being triggered to be transmitted at a trigger time point, the processor determines that the first uplink radio resource is a periodic radio resource and corresponds to a first logical channel with a first priority, and determines that the second uplink radio resource is a scheduled uplink radio resource and corresponds to the first logical channel with the first priority, and when the overlapped period exists, the processor further determines that the second uplink information has the high priority.

9. The user equipment of claim 1, wherein the first uplink radio resource is a first scheduled uplink radio resource on a physical uplink control channel (PUCCH), the second uplink radio resource is a second scheduled uplink radio resource on the PUCCH, the first scheduled uplink radio resource is scheduled by a base station (BS) earlier than the second scheduled uplink radio resource, and when the overlapped period exists, the processor further executes the operations comprising:
  determining that the second uplink information has a high priority based on the first uplink information belongs to a first service type and the second uplink information belongs to a second service type;
  interrupting the transmission of the first uplink information on the first uplink radio resource when the first uplink information is transmitting on the first uplink radio resource, and transmitting the second uplink information on the second uplink radio resource; and
  stopping proceeding to transmit the first uplink information when the first uplink information is not transmitted yet, and transmitting the second uplink information on the second uplink radio resource.

10. The user equipment of claim 9, wherein the first uplink radio resource corresponds to a first logical channel with a lower priority, and the second uplink radio resource corresponds to a second logical channel with a higher priority.

11. The user equipment of claim 1, wherein the processor further executes the operations, comprising:
  determining that the first uplink radio resource and a third uplink radio resource of the uplink radio resources belong to the first group, and the second uplink radio resource belongs to a second group;
  determining whether there exists a piece of third uplink information corresponding to the third uplink radio resource;
  determining whether there exists a triple overlapped period among the first uplink radio resource, the second uplink radio resource and the third uplink radio resource in the time domain;
  wherein when the triple overlapped period exists, the processor further executes the following operations:
    determining that the second uplink information has a high priority based on the first group belongs to a first service type and the second group belongs to a second service type; and
    stopping proceeding to transmit the first uplink information and the third uplink information when the first uplink information and the third uplink information are not transmitted yet, and transmitting the second uplink information on the second uplink radio resource;
  wherein when the second uplink information does not exist and the first uplink information and the third uplink information exist at the same time, the processor further executes the following operations:
  determining whether there exists another overlapped period in the time domain between the first uplink radio resource and the third uplink radio resource;
  determining whether the first uplink information and the third uplink information can be jointly transmitted when the another overlapped period exists;
  transmitting the first uplink information and the third uplink information on the first uplink radio resource when the first uplink information and the third uplink information can be jointly transmitted; and
  transmitting the first uplink information on the first uplink radio resource when the first uplink information and the third uplink information cannot be jointly transmitted.

12. The user equipment of claim 11, wherein the first uplink radio resource corresponds to a first logical channel with a second priority, the second uplink radio resource corresponds to a second logical channel with a first priority, and the third uplink radio resource corresponds to the first logical channel with the second priority.

13. The user equipment of claim 1, wherein the processor further executes the operations, comprising:
   determining that the first uplink radio resource and a third uplink radio resource of the uplink radio resources belong to the first group, and the second uplink radio resource and a fourth uplink radio resource of the uplink radio resources belong to a second group, wherein the first group belongs to a first service type and the second group belongs to a second service type;
   determining whether there exists a piece of third uplink information which corresponds to the third uplink radio resource;
   determining whether there exists a piece of fourth uplink information which corresponds to the fourth uplink radio resource;
   when the first uplink information, the second uplink information, the third uplink information and the fourth uplink information exist at the same time, determining whether there exists the overlapped period between the first uplink radio resource and the second uplink radio resource in the time domain, whether there exists a first overlapped period between the first uplink radio resource the third uplink radio resource in the time domain, and whether there exists a second overlapped period between the second uplink radio resource and the fourth uplink radio resource in the time domain; and
   transmitting the first uplink information and the third uplink information on the first uplink radio resource and transmitting the second uplink information and the fourth uplink information on the second uplink radio resource when the overlapped period does not exist and the first overlapped period and the second overlapped period exist.

14. The user equipment of claim 13, wherein the first uplink radio resource corresponds to a first logical channel with a first priority, the second uplink radio resource corresponds to a second logical channel with a second priority, the third uplink radio resource corresponds to the first logical channel with the first priority, and the fourth uplink radio resource corresponds to the second logical channel with the second priority.

15. The user equipment of claim 1, wherein the processor further executes the operations, comprising:
   determining that the first uplink radio resource and a third uplink radio resource of the uplink radio resources belong to the first group, and the second uplink radio resource and a fourth uplink radio resource of the uplink radio resources belong to a second group, wherein the first group belongs to a first service type and the second group belongs to a second service type;
   determining whether there exists a piece of third uplink information which corresponds to the third uplink radio resource;
   determining whether there exists a piece of fourth uplink information which corresponds to the fourth uplink radio resource;
   when the first uplink information, the second uplink information, the third uplink information and the fourth uplink information exist at the same time, determining whether there exists the overlapped period between the first uplink radio resource and the second uplink radio resource in the time domain, whether there exists a first overlapped period between the first uplink radio resource the third uplink radio resource in the time domain, whether there exists a second overlapped period between the second uplink radio resource and the fourth uplink radio resource in the time domain, and whether there exists a third overlapped period between the first uplink radio resource and the fourth uplink radio resource in the time domain; and
   transmitting the first uplink information and the third uplink information on the first uplink radio resource and transmitting the second uplink information and the fourth uplink information on the fourth uplink radio resource when the overlapped period, the first overlapped period and the second overlapped period exist and the third overlapped period does not exist.

16. The user equipment of claim 15, wherein the first uplink radio resource corresponds to a first logical channel with a first priority, the second uplink radio resource corresponds to a second logical channel with a second priority, the third uplink radio resource corresponds to the first logical channel with the first priority, and the fourth uplink radio resource corresponds to the second logical channel with the second priority.

17. A base station (BS) for a mobile communication system, comprising:
   a storage;
   a transceiver; and
   a processor electrically connected to the storage and the transceiver, being configured to execute the operations, comprising:
      determining that there are a plurality of uplink radio resources and dividing the uplink radio resources into at least one group;
      determining that there exists an overlapped period between a first uplink radio resource and a second uplink radio resource of the uplink radio resources in a time domain;
      determining whether the first uplink radio resource and the second uplink radio resource belong to a same group of the at least one group;
      determining whether a piece of first uplink information corresponding to the first uplink radio resource and a piece of second uplink information corresponding to the second uplink radio resource can be jointly transmitted on one of the first uplink radio resource and the second uplink radio resource;
      determining whether a first uplink signal on the first uplink radio resource is received via the transceiver;
      determining whether a second uplink signal on the second uplink radio resource is received via the transceiver;
      decoding the first uplink signal to obtain the first uplink information or obtain the first uplink information and the second uplink information at the same time when only receiving the first uplink signal on the first uplink radio resource and the first uplink information and the second uplink information can be jointly transmitted on the first uplink radio resource;
      decoding the second uplink signal to obtain the first uplink information or obtain the first uplink information and the second uplink information at the same time when only receiving the second uplink signal on the second uplink radio resource and the first uplink information and the second uplink information can be jointly transmitted on the second uplink radio resource; and
      decoding the second uplink signal to obtain the second uplink information if the first uplink radio resource and the second uplink radio resource does not belong to the same group when receiving the first uplink signal on the first uplink radio resource and receiving the second uplink signal on the second uplink radio resource, wherein only the second uplink radio resource has the second uplink signal during the overlapped period.

18. The base station of claim 17, wherein the processor further decodes the first uplink signal to obtain the first uplink information if the first uplink signal exists on the first uplink radio resource except during the overlapped period when receiving the first uplink signal on the first uplink radio resource and receiving the second uplink signal on the second uplink radio resource.

\* \* \* \* \*